(12) United States Patent
Yoshida et al.

(10) Patent No.: US 10,873,695 B2
(45) Date of Patent: Dec. 22, 2020

(54) DISPLAY CONTROL APPARATUS, ELECTRONIC APPARATUS, AND CONTROL METHOD THEREFOR

(71) Applicant: CANON KABUSHIKI KAISHA, Tokyo (JP)

(72) Inventors: Koji Yoshida, Fujisawa (JP); Ryu Wakui, Tokyo (JP); Shingo Yamazaki, Tokyo (JP); Takuro Miyajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 15/849,499

(22) Filed: Dec. 20, 2017

(65) Prior Publication Data

US 2018/0183994 A1 Jun. 28, 2018

(30) Foreign Application Priority Data

Dec. 27, 2016 (JP) .................................. 2016-254220
Dec. 27, 2016 (JP) .................................. 2016-254221
(Continued)

(51) Int. Cl.
*H04N 5/232* (2006.01)
*G03B 5/00* (2006.01)
(Continued)

(52) U.S. Cl.
CPC .......... *H04N 5/23216* (2013.01); *G03B 5/00* (2013.01); *G03B 7/00* (2013.01); *G03B 9/00* (2013.01);
(Continued)

(58) Field of Classification Search
CPC .......... H04N 5/23216; H04N 5/23293; H04N 5/23245; H04N 5/232935;
(Continued)

(56) References Cited

U.S. PATENT DOCUMENTS 6,301,440 B1 10/2001 Bolle
7,493,571 B2 * 2/2009 Shinohara .......... H04N 5/23293
715/810

(Continued)

FOREIGN PATENT DOCUMENTS

CN 103472971 A 12/2013
CN 103929590 A 7/2014
(Continued)

*Primary Examiner* — Albert H Cutler
(74) *Attorney, Agent, or Firm* — Canon U.S.A., Inc. IP Division

(57) ABSTRACT

A display control apparatus includes a switching unit configured to switch a display mode of a setting screen between a first display mode and a second display mode, the setting screen being arranged to display a plurality of setting items, including a predetermined setting item; and a control unit configured to, in the first display mode, display on the setting screen a first item related to the predetermined setting item and a plurality of items related to a plurality of setting items different from the predetermined setting item, and display a second item, on the setting screen in the case that the first item is selected, the second item representing candidate values which may be set, and in the second display mode, display on the setting screen a third item representing candidate values which may be set, and display a plurality of items related to the plurality of setting items.

14 Claims, 25 Drawing Sheets

(30) Foreign Application Priority Data

Dec. 27, 2016 (JP) ................................ 2016-254222
Dec. 27, 2016 (JP) ................................ 2016-254223

(51) Int. Cl.
| | |
|---|---|
| G03B 9/00 | (2006.01) |
| G03B 7/00 | (2014.01) |
| G06F 3/0484 | (2013.01) |
| G06F 3/0488 | (2013.01) |
| G06F 3/041 | (2006.01) |
| G03B 17/14 | (2006.01) |
| G03B 17/18 | (2006.01) |
| H04N 5/225 | (2006.01) |
| G06F 3/00 | (2006.01) |
| G06F 3/048 | (2013.01) |

(52) U.S. Cl.
CPC .......... *G06F 3/0416* (2013.01); *G06F 3/0484* (2013.01); *G06F 3/0488* (2013.01); *H04N 5/23293* (2013.01); *H04N 5/232935* (2018.08); *H04N 5/232122* (2018.08)

(58) Field of Classification Search
CPC .... H04N 5/232122; H04N 5/225; G03B 5/00; G03B 9/00; G03B 7/00; G03B 17/14; G03B 17/18; G06F 3/0416; G06F 3/0488; G06F 3/0484; G06F 3/00; G06F 3/048
USPC ........................................ 348/333.01–333.13
See application file for complete search history.

(56) References Cited

U.S. PATENT DOCUMENTS

| | | | | |
|---|---|---|---|---|
| 8,698,936 | B2* | 4/2014 | Park | H04N 5/23293 |
| | | | | 345/581 |
| 9,325,902 | B2* | 4/2016 | Yoshida | H04N 5/23222 |
| 2002/0030754 | A1* | 3/2002 | Sugimoto | H04N 5/23293 |
| | | | | 348/333.02 |
| 2005/0001024 | A1* | 1/2005 | Kusaka | H04N 1/00281 |
| | | | | 235/375 |
| 2006/0192879 | A1 | 8/2006 | Hisamatsu | |
| 2007/0172224 | A1 | 7/2007 | Yukitake | |
| 2008/0084398 | A1* | 4/2008 | Ito | G06F 3/03547 |
| | | | | 345/173 |
| 2008/0297638 | A1* | 12/2008 | Hiratsuka | G06F 3/0227 |
| | | | | 348/333.02 |
| 2009/0027515 | A1* | 1/2009 | Maruyama | H04N 5/235 |
| | | | | 348/223.1 |
| 2009/0284637 | A1 | 11/2009 | Parulski | |
| 2010/0026873 | A1 | 2/2010 | Lee | |
| 2010/0033614 | A1* | 2/2010 | Yoo | H04N 5/23206 |
| | | | | 348/333.02 |
| 2011/0058087 | A1* | 3/2011 | Ito | H04N 5/23245 |
| | | | | 348/333.12 |
| 2011/0249165 | A1* | 10/2011 | Churei | G03B 13/02 |
| | | | | 348/333.02 |
| 2013/0201128 | A1* | 8/2013 | Matsushima | G06F 3/0416 |
| | | | | 345/173 |
| 2013/0249829 | A1* | 9/2013 | Hitosuga | G06F 3/0488 |
| | | | | 345/173 |
| 2014/0049677 | A1 | 2/2014 | Kawaguchi | |
| 2014/0267869 | A1 | 9/2014 | Sawa | |
| 2014/0375862 | A1* | 12/2014 | Kim | H04N 5/23245 |
| | | | | 348/333.02 |
| 2015/0049233 | A1* | 2/2015 | Choi | H04N 5/232 |
| | | | | 348/333.01 |
| 2015/0149945 | A1* | 5/2015 | Izaki | G06F 3/0482 |
| | | | | 715/771 |
| 2015/0242102 | A1* | 8/2015 | Enami | G06F 3/0482 |
| | | | | 345/680 |
| 2016/0057357 | A1* | 2/2016 | Oka | H04N 5/23216 |
| | | | | 348/333.01 |
| 2016/0191800 | A1* | 6/2016 | Yoshikawa | H04N 5/23293 |
| | | | | 348/220.1 |

FOREIGN PATENT DOCUMENTS

| | | |
|---|---|---|
| JP | 58-83831 A | 5/1983 |
| JP | 2000-050241 A | 2/2000 |
| JP | 2005-175616 A | 6/2005 |
| JP | 2005-21995 A | 7/2005 |
| JP | 2007-110434 A | 4/2007 |
| JP | 2008-048215 A | 2/2008 |
| JP | 2009-141765 A | 6/2009 |
| JP | 2010-093392 A | 4/2010 |
| JP | 2012-163631 A | 8/2012 |
| JP | 2012-230258 A | 11/2012 |
| JP | 05434327 B2 | 3/2014 |
| JP | 05725793 B2 | 5/2015 |
| KR | 10-1998-0033129 A | 7/1998 |
| KR | 10-2010-0018334 A | 2/2010 |
| KR | 10-2013-0059681 A | 6/2013 |
| RU | 2347261 C2 | 2/2009 |

* cited by examiner

FIG. 16

| SHOOTING MODE | | HINT GUIDE | SETTING | | DETAILED HINT |
|---|---|---|---|---|---|
| P MODE | OVEREXPOSURE | THE PICTURE WILL BE TOO LIGHT | ISOAUTO | | THE SUBJECT IS TOO BRIGHT AND CANNOT BE SHOT AT PROPER EXPOSURE. THE PICTURE WILL HAVE BLOWN-OUT HIGHLIGHTS. |
| | | | ISO MANUAL | ISO100 | THE SUBJECT IS TOO BRIGHT AND CANNOT BE SHOT AT PROPER EXPOSURE. THE PICTURE WILL HAVE BLOWN-OUT HIGHLIGHTS. |
| | | | | OTHER THAN ISO100 | THE SUBJECT IS TOO BRIGHT AND CANNOT BE SHOT AT PROPER EXPOSURE. DECREASE ISO SPEED (SET SMALLER VALUE). |
| | UNDEREXPOSURE | THE PICTURE WILL BE TOO DARK | ISOAUTO ISO MANUAL | | THE SUBJECT IS TOO DARK AND CANNOT BE SHOT AT PROPER EXPOSURE. THE PICTURE WILL HAVE BLOCKED-UP SHADOWS. |
| Tv MODE | OVEREXPOSURE | THE PICTURE WILL BE TOO LIGHT | ISOAUTO | FASTEST Tv | THE SUBJECT IS TOO BRIGHT AND CANNOT BE SHOT AT PROPER EXPOSURE. THE PICTURE WILL HAVE BLOWN-OUT HIGHLIGHTS. |
| | | | | NOT FASTEST Tv | THE SUBJECT IS TOO BRIGHT AND CANNOT BE SHOT AT PROPER EXPOSURE. INCREASE SHUTTER SPEED (DIRECTION OF "FREEZE"). |
| | | | ISO MANUAL | ISO100 AND FASTEST Tv | THE SUBJECT IS TOO BRIGHT AND CANNOT BE SHOT AT PROPER EXPOSURE. THE PICTURE WILL HAVE BLOWN-OUT HIGHLIGHTS. |
| | | | | OTHER THAN ISO100 OR NOT FASTEST Tv | THE SUBJECT IS TOO BRIGHT AND CANNOT BE SHOT AT PROPER EXPOSURE. INCREASE SHUTTER SPEED (DIRECTION OF "FREEZE") OR DECREASE ISO SPEED (SET SMALLER VALUE). |
| | UNDEREXPOSURE | THE PICTURE WILL BE TOO DARK | ISOAUTO ISO MANUAL | SLOWEST Tv | THE SUBJECT IS TOO DARK AND CANNOT BE SHOT AT PROPER EXPOSURE. THE PICTURE WILL HAVE BLOCKED-UP SHADOWS. |
| | | | | FASTER THAN 1/60 SEC | THE SUBJECT IS TOO DARK AND CANNOT BE SHOT AT PROPER EXPOSURE. DECREASE SHUTTER SPEED (DIRECTION OF "BLUR"). |
| | | | | 1/60 SEC OR SLOWER | THE SUBJECT IS TOO DARK AND CANNOT BE SHOT AT PROPER EXPOSURE. USE STROBE OR DECREASE SHUTTER SPEED (DIRECTION OF "BLUR"). |
| Av MODE | OVEREXPOSURE | THE PICTURE WILL BE TOO LIGHT | ISOAUTO | LARGEST Av | THE SUBJECT IS TOO BRIGHT AND CANNOT BE SHOT AT PROPER EXPOSURE. THE PICTURE WILL HAVE BLOWN-OUT HIGHLIGHTS. |
| | | | | NOT LARGEST Av | THE SUBJECT IS TOO BRIGHT AND CANNOT BE SHOT AT PROPER EXPOSURE. INCREASE APERTURE VALUE (DIRECTION OF "SHARPEN"). |
| | | | ISO MANUAL | ISO100 AND LARGEST Av | THE SUBJECT IS TOO BRIGHT AND CANNOT BE SHOT AT PROPER EXPOSURE. THE PICTURE WILL HAVE BLOWN-OUT HIGHLIGHTS. |
| | | | | OTHER THAN ISO100 OR NOT LARGEST Av | THE SUBJECT IS TOO BRIGHT AND CANNOT BE SHOT AT PROPER EXPOSURE. INCREASE APERTURE VALUE (DIRECTION OF "SHARPEN") OR DECREASE ISO SPEED (SET SMALLER VALUE). |
| | UNDEREXPOSURE | THE PICTURE WILL BE TOO DARK | ISOAUTO ISO MANUAL | | THE SUBJECT IS TOO DARK AND CANNOT BE SHOT AT PROPER EXPOSURE. THE PICTURE WILL HAVE BLOCKED-UP SHADOWS. |

DISPLAY CONTROL APPARATUS, ELECTRONIC APPARATUS, AND CONTROL METHOD THEREFOR

BACKGROUND OF THE INVENTION

Field of the Invention

The present invention relates to a technique for performing settings of items.

Description of the Related Art

There is a technique for displaying a list of items for which the settings can be changed on one screen in an apparatus, such as a digital camera, having a plurality of items for which the settings can be changed. Japanese Patent Laid-Open No. 2010-93392 discloses a technique for displaying a list of a plurality of setting items regarding shooting in the forms of characters. Japanese Patent Laid-Open No. 2000-50241 discloses a technique for displaying a list of setting items, such as color tone, color density, aperture value, shutter speed, image stabilization, and operation mode, together with a list of candidate values to be set for the individual setting items, on a camera setting application screen.

Regarding a screen described in Japanese Patent Laid-Open No. 2010-93392, it may be difficult for a beginner to select a value of a setting item if many items are displayed in a list view. Regarding a method described in Japanese Patent Laid-Open No. 2000-50241, even a beginner may understand the settings that will be made in individual setting items, but it may be impossible for the beginner to select a setting item for which the setting is to be changed and to make a desired setting. Furthermore, in a case where candidate values are displayed together with setting items, the number of setting items that can be displayed at a time is smaller than in the list described in Japanese Patent Laid-Open No. 2010-93392. In this case, the operability may be unsatisfactory for a user who is skilled in handling the apparatus because the user is unable to see many setting items at a time.

As for the setting of an aperture value of a digital camera, the degree of background blur increases as the aperture value decreases, and the degree of background sharpness increases as the aperture value increases. There are also other setting items for shooting, in addition to aperture value, the set values of which give a captured image different effects, such as shutter speed, white balance, and ISO speed. Japanese Patent Laid-Open No. 2008-48215 discloses a technique for displaying two aperture values and sample images of backgrounds that will be obtained at the two individual aperture values, thereby showing a user the effects of the aperture values.

With the method described in Japanese Patent Laid-Open No. 2008-48215, a user can understand that an effect of background blur is increased by setting a smaller aperture value. However, it may be difficult for a beginner to know whether there is a method for obtaining an effect of blur other than changing the aperture value. Also, as for other setting items, even if there is a method for changing an effect on an image to be captured other than changing a set value, it may be difficult for a beginner to know what to do. For example, a faster shutter speed suppresses blurring caused by camera shake. Although there are other methods for suppressing blurring caused by camera shake, such as mounting a camera on a tripod or using a self-timer, a beginner may be unable to know such methods. Accordingly, a user who wants to obtain a further desired effect after changing a set value may be unable to obtain an image having the desired effect.

There is a method for setting a value by performing an operation on a bar. Japanese Patent Laid-Open No. 2012-230258 discloses a technique for setting an in-focus position by moving a cursor on a bar that indicates a distance to a subject. There is also a technique for displaying a guidance about a selected item. Japanese Patent Laid-Open No. 2012-163631 discloses a technique in which, when one of a plurality of different setting items is selected, a guidance about the selected setting item is displayed for a predetermined period of time.

In the case of setting a value on a bar as in Japanese Patent Laid-Open No. 2012-230258, if a guidance about a selected target is changed every time a selection operation is performed as in Japanese Patent Laid-Open No. 2012-163631, a user can view a guidance about a selected target only after actually moving a cursor. That is, the user needs to perform a setting operation without knowing where the effect or instructions displayed in a guidance will be changed, and needs to check a guidance every time the user moves the cursor or needs to actually move the cursor to check the guidance.

There is a technique for setting a value by using a bar in an apparatus such as a digital camera. Japanese Patent Laid-Open No. 2012-230258 discloses a technique in which a distance bar used to achieve focus has a small interval between tick marks indicating a distant position and a large interval between tick marks indicating a nearby position, so that a nearby subject can be accurately focused on. Japanese Patent Laid-Open No. 58-83831 discloses a technique for giving a camera shake warning if a set shutter speed is likely to cause blurring due to camera shake.

As described in Japanese Patent Laid-Open No. 58-83831, set values that are likely to cause blurring due to camera shake need to be used carefully. In the method described in Japanese Patent Laid-Open No. 2012-230258, the interval between tick marks on the distance bar varies depending on the distance to a subject. Thus, the interval between tick marks indicating short distances is large even if the tick marks correspond to values that need to be used carefully, and accordingly the range in the bar indicating the values that need to be used carefully increases. As a result, the user may think that any values may be set similarly and may set a value without being aware that the value is a value to be used carefully, for example, the value is likely to cause blurring due to camera shake.

An embodiment of the present invention is directed to enabling both a beginner and a user who is skilled in handling the apparatus to perform a setting operation for a setting item with enhanced operability. In other words, the present invention assists a user in operating the apparatus by providing technical information to enable the user to properly operate the system. Prompts enable a user, skilled or otherwise, to interact with the apparatus in a continued or guided way for enabling its proper functioning.

An embodiment of the present invention is directed to more easily obtaining an image with an effect desired by a user by using a method other than changing of a set value of a setting item.

An embodiment of the present invention is directed to increasing user operability in the case of setting a value of a setting item.

An embodiment of the present invention is directed to decreasing a possibility that a value, which a user should be careful when the value is set among candidate values, is set without the intention of a user.

SUMMARY OF THE INVENTION

A display control apparatus according to an embodiment of the present invention includes a switching unit configured to switch a display mode of a setting screen between a first display mode and a second display mode, the setting screen being arranged to display a plurality of setting items, including a predetermined setting item; and a control unit configured to, in the first display mode, display on the setting screen a first item which is related to the predetermined setting item and a plurality of items related to a plurality of setting items different from the predetermined setting item, and display a second item, on the setting screen in the case that the first item is selected, the second item representing candidate values which may be set as a value of the predetermined setting item, and in the second display mode, display on the setting screen a third item representing candidate values which may be set as a value of the predetermined setting item, and display a plurality of items related to the plurality of setting items.

A display control apparatus according to an embodiment of the present invention includes a selecting unit configured to select, as a value to be set for a predetermined setting item regarding shooting, a value on a predetermined screen from among a plurality of candidate values including a first value and a second value that makes a predetermined effect larger; and a control unit configured to perform control to display, on a display unit, an indication for indicating a method for enhancing the predetermined effect by using a method different from setting of a value of the predetermined setting item, if a predetermined operation is performed in a state where the predetermined screen is displayed on the display unit, the predetermined operation being an operation of selecting a value from among the plurality of candidate values so that the predetermined effect increases.

A display control apparatus according to an embodiment of the present invention includes a receiving unit configured to receive an operation of designating any one of positions on a display unit corresponding to a plurality of candidate values each being settable as a value of a predetermined setting item; a selecting unit configured to select, upon receipt by the receiving unit of the operation of designating any one of the positions on the display unit corresponding to the plurality of candidate values, a value corresponding to the designated position from among the plurality of candidate values; a control unit configured to, in a state where a first range and a second range are adjacent to each other, the first range corresponding to a first value group including a plurality of candidate values, the second range corresponding to a second value group including a plurality of candidate values, perform control to display a first guidance if any one of the candidate values included in the first value group is selected and to display a second guidance if any one of the candidate values included in the second value group is selected; and a display control unit configured to perform control to display a mark representing a boundary between the first range and the second range on the display unit.

An electronic apparatus according to an embodiment of the present invention includes a receiving unit configured to receive an operation of designating any one of positions on a display unit corresponding to a plurality of candidate values of a predetermined setting item; a selecting unit configured to select, upon receipt by the receiving unit of the operation of designating any one of the positions on the display unit corresponding to the plurality of candidate values, a value corresponding to the designated position from among the plurality of candidate values; and a display control unit configured to perform control to display a predetermined warning on the display unit if an operation of designating a position corresponding to a first value group of the predetermined setting item is performed and not to display the predetermined warning on the display unit if an operation of designating a position corresponding to a second value group of the predetermined setting item is performed. An interval between positions on the display unit corresponding to individual values included in the first value group is smaller than an interval between positions on the display unit corresponding to individual values included in the second value group.

Further features of the present invention will become apparent from the following description of exemplary embodiments with reference to the attached drawings.

BRIEF DESCRIPTION OF THE DRAWINGS

FIG. 16 is a diagram for describing detailed hints in a case of underexposure and overexposure.

DESCRIPTION OF THE EMBODIMENTS

Hereinafter, exemplary embodiments of the present invention will be described with reference to the drawings.

Figure 1A:
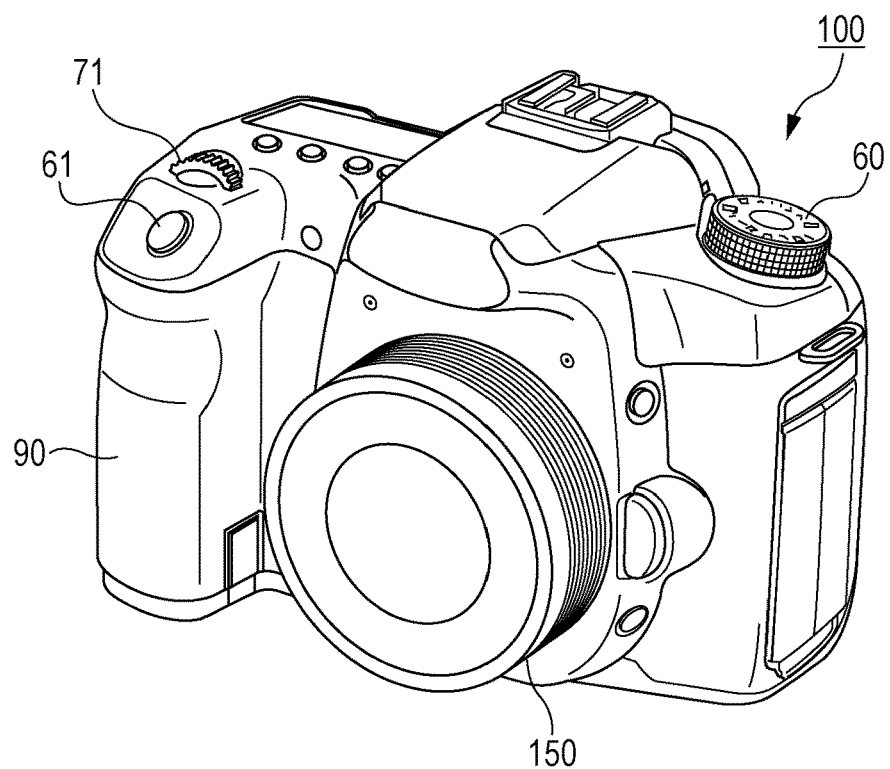
FIGS. 1A and 1B illustrate external appearances of a digital camera, which is an example of an apparatus to which a configuration of an exemplary embodiment of the present invention is applicable.
Figure 1B:
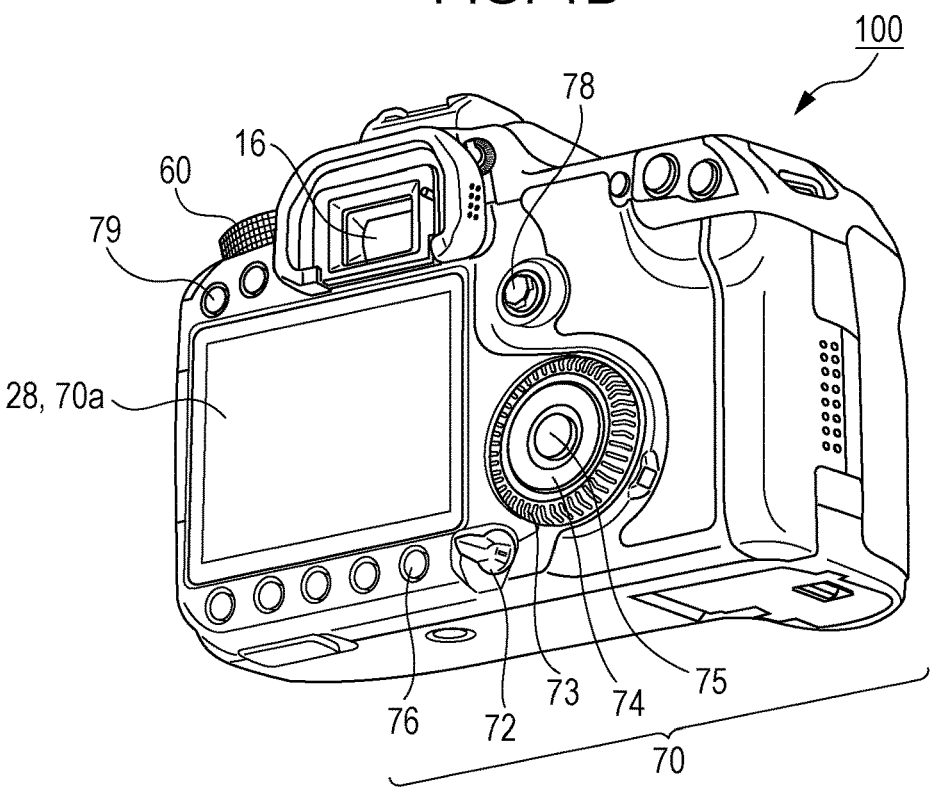

FIGS. 1A and 1B illustrate external appearances of a digital camera 100, which is an exemplary embodiment of an image capturing apparatus to which the present invention is applicable. FIG. 1A is a perspective view of a front surface of the digital camera 100, and FIG. 1B is a perspective view of a back surface of the digital camera 100. In FIG. 1B, a display unit 28 is a display unit that displays images and various pieces of information. The display unit 28 is superimposed on or integrated with a touch screen 70a that is capable of receiving or detecting a touch operation.

A shutter button 61 is an operation unit for providing a shooting instruction. A mode selection switch 60 is an operation unit for switching between various modes. A main electronic dial 71 is a rotary operation member. By rotating the main electronic dial 71, a set value such as a shutter speed or an aperture value can be changed. A power switch 72 is an operation member for switching between ON and OFF of the power of the digital camera 100. A sub electronic dial 73 is a rotary operation member for changing a selected frame or viewing a next/preceding image. A cross key 74 is a four-way key whose upper, lower, left, and right portions can be pressed. When one of these portions of the cross key 74 is pressed, an operation is performed in accordance with the pressed portion. A set button 75 is a push button that is used mainly for setting a selected item. An LV button 78 is a button for switching between ON and OFF of live view (LV). A playback button 79 is an operation button for switching between a shooting mode (shooting screen) and a playback mode (playback screen). A Q button 76 is a button for making a quick setting. When the Q button 76 is pressed while the shooting screen is displayed, a setting item displayed in a list of setting items becomes selectable. When a setting item is selected, it becomes possible to move to a setting screen of the setting item. When the playback button 79 is pressed in the shooting mode, the mode changes to the playback mode, so that the latest image among the images recorded on a recording medium 200 (illustrated in FIG. 2) can be displayed on the display unit 28. The power switch 72 is a button for switching between ON and OFF of the power of the digital camera 100. The shutter button 61, the main electronic dial 71, the power switch 72, the sub electronic dial 73, the cross key 74, the set button 75, the LV button 78, the playback button 79, and the Q button 76 are included in an operation unit 70. A viewfinder 16 is a look-into-type finder for checking the focal point and the composition of an optical image of a subject obtained through a lens unit 150. A grip portion 90 is a holding portion having a shape that enables a user to easily grip it with the right hand when the user holds the digital camera 100.

Figure 2:
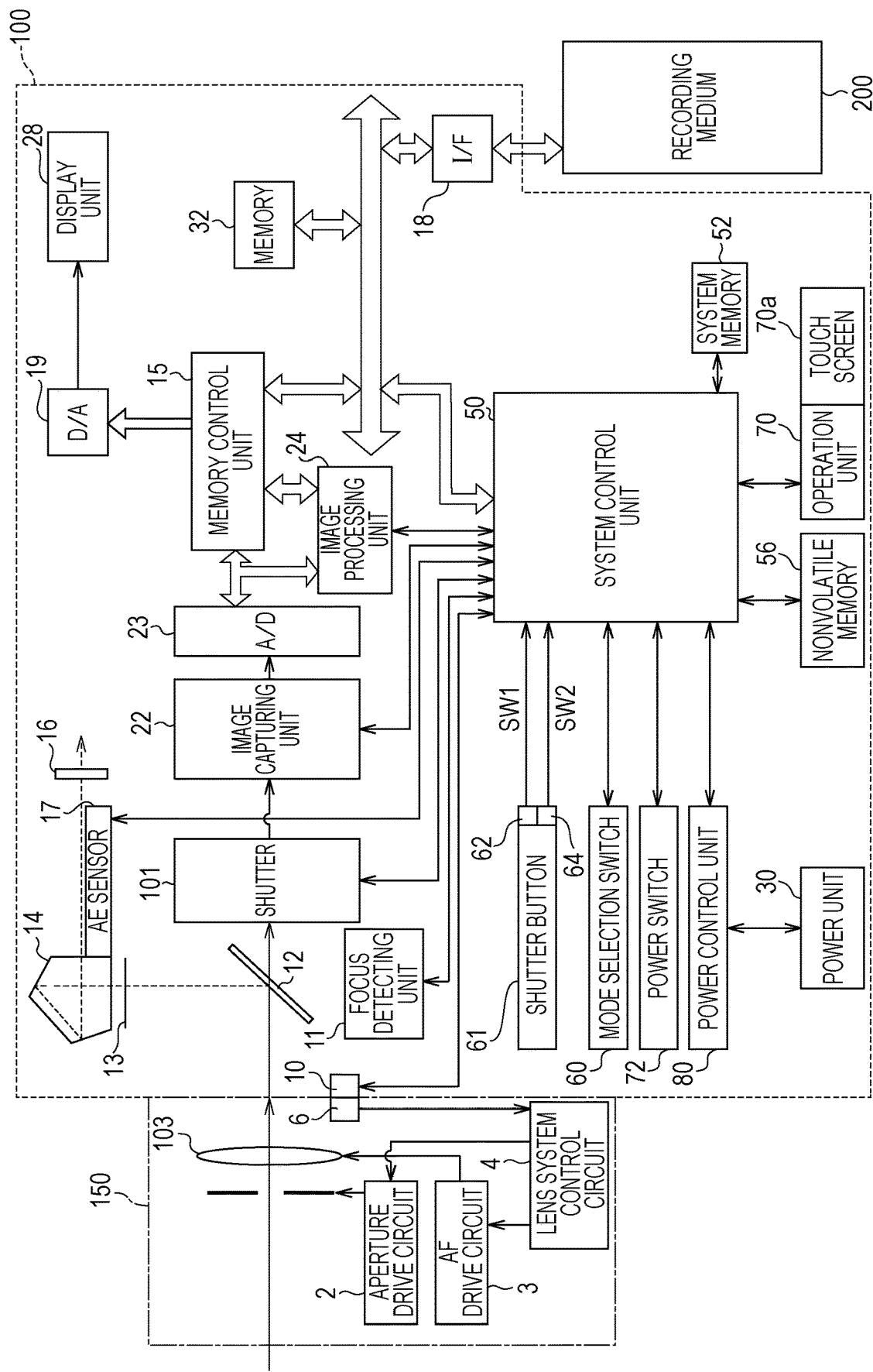
FIG. 2 is a block diagram illustrating an example configuration of the digital camera, which is an example of an apparatus to which a configuration of an exemplary embodiment of the present invention is applicable.

FIG. 2 is a block diagram illustrating an example configuration of the digital camera 100 according to the exemplary embodiment.

In FIG. 2, the lens unit 150 is a lens unit in which an exchangeable photographing lens is mounted.

A lens 103 normally includes a plurality of lenses, but only one lens is illustrated as the lens 103 here for simplicity. A communication terminal 6 is a communication terminal used by the lent unit 150 to communicate with the digital camera 100. A communication terminal 10 is a communication terminal used by the digital camera 100 to communicate with the lent unit 150. The lens unit 150 communicates with a system control unit 50 via the communication terminals 6 and 10. A lens system control circuit 4 in the lens unit 150 controls the aperture via an aperture drive circuit 2, and causes the lens 103 to be displaced to achieve focus via an AF drive circuit 3. The lens unit 150 is mounted on a main body including the display unit 28 via a mounting unit on which the lens unit 150 is mountable. Various types of lens units such as a single-focus lens and a zoom lens may be mounted as the lens unit 150.

An AE sensor 17 measures the brightness of a subject in an image formed on a focusing screen 13 through the lens unit 150 and a quick-return mirror 12.

A focus detecting unit 11 is an AF sensor that uses a phase-difference detection scheme and that captures an image through the quick-return mirror 12 and outputs defocus amount information to the system control unit 50. The system control unit 50 controls the lens unit 150 on the basis of the defocus amount information and performs phase-difference detection AF. The method for AF is not necessarily phase-difference detection AF, and may be contrast AF. The phase-difference detection AF may be performed on the basis of a defocus amount detected on an image capturing plane of an image capturing unit 22 without using the focus detecting unit 11 (image capturing plane phase-difference detection AF).

The quick-return mirror 12 (hereinafter referred to as a mirror 12) is moved up or down by an actuator (not illustrated) in response to an instruction provided from the system control unit 50 at the time of exposure, live view shooting, or movie shooting. The mirror 12 switches the direction of a light flux entering through the lens 103 between a direction toward the viewfinder 16 and a direction toward the image capturing unit 22. In a normal state, the mirror 12 is placed so as to reflect a light flux and lead the light flux to the viewfinder 16. However, at the time of shooting or live view display, the mirror 12 is flipped up out of the light path to lead a light flux to the image capturing unit 22 (mirror lockup). The mirror 12 is a half mirror having a center portion through which part of light passes. The mirror 12 allows part of light to pass therethrough so that the part of light enters the focus detecting unit 11 that detects a focal point.

A photographer observes an image formed on the focusing screen 13 through a pentaprism 14 and the viewfinder 16, thereby being able to check the focus state and the composition of an optical image of a subject obtained through the lens unit 150.

A focal plane shutter 101 (shutter 101) is used to control an exposure time in the image capturing unit 22 under the control of the system control unit 50.

The image capturing unit 22 is an image capturing device that converts an optical image into an electric signal, such as a charge-coupled device (CCD) or a complementary metal-oxide semiconductor (CMOS) device. An A/D converter 23 is used to convert an analog signal output from the image capturing unit 22 into a digital signal.

An image processing unit 24 performs a resizing process such as predetermined pixel interpolation or size reduction and a color conversion process on data received from the A/D converter 23 or data received from a memory control unit 15. The image processing unit 24 further performs predetermined arithmetic processing by using captured image data. On the basis of a result of the arithmetic processing, the system control unit 50 performs exposure control and ranging control. Accordingly, an autofocus (AF) process, an automatic exposure (AE) process, and a pre-flash (EF) process in the through-the-lens (TTL) scheme are performed. The image processing unit 24 further performs predetermined arithmetic processing by using captured image data, and performs an automatic white balance (AWB) process in the TTL scheme on the basis of a result of the arithmetic processing.

A memory 32 stores image data that is obtained by the image capturing unit 22 and converted into digital data by the A/D converter 23, and image data to be displayed on the display unit 28. The memory 32 has an enough storage capacity to store a predetermined number of still images, a predetermined length of movie, and audio data. The memory 32 may be a removable recording medium such as a memory card or may be a built-in memory.

The display unit 28 is a back monitor that displays an image, and is disposed on the back surface of the digital camera 100 as illustrated in FIG. 1B. A D/A converter 19 converts data to be displayed as an image stored in the memory 32 into an analog signal and then supplies the analog signal to the display unit 28. The display unit 28 may be a liquid crystal display or any other types of display that displays an image, such as an organic electroluminescence (EL) display.

A nonvolatile memory 56 is a memory from which data can be electrically erased and on which data can be electrically recorded by the system control unit 50, and may be, for example, an electrically erasable programmable read only memory (EEPROM). The nonvolatile memory 56 stores constants for operating the system control unit 50, programs, and so forth. Here, the programs are those used to execute various processes corresponding to the flowcharts described below in the exemplary embodiment.

The system control unit 50 includes at least one processor therein and controls the entire digital camera 100. With the programs recorded in the nonvolatile memory 56 being executed, the processes according to the exemplary embodiment described below are performed. In a system memory 52, constants and variables for operating the system control unit 50, programs read from the nonvolatile memory 56, and so forth are expanded. The system control unit 50 also performs display control by controlling the memory 32, the D/A converter 19, the display unit 28, and so forth.

The mode selection switch 60 switches the operation mode of the system control unit 50 to any one of a still image shooting mode including a basic shooting zone and an advanced shooting zone, a movie shooting mode, and the like. The basic shooting zone in the still image shooting mode includes a fully-automatic mode in which the camera determines a scene and sets values, a creative mode in which the camera sets values in response to a user setting of a desired shooting result, a portrait mode, a landscape mode, a macro mode, and so forth. The advanced shooting zone includes a P mode (program AE), an M mode (manual), an Av mode (aperture-priority AE), a Tv mode (shutter-priority AE), and so forth. Alternatively, a menu screen may be displayed by using the mode selection switch 60 and then any one of these modes included in the menu screen may be selected by using another operation member. Also, the movie shooting mode may include a plurality of modes. In the Av mode, the user sets an aperture value, the camera automatically adjusts a shutter speed and an ISO speed in accordance with a metering result so as to achieve proper exposure, and then shooting is performed. In the Tv mode, the user sets a shutter speed, the camera automatically adjusts an aperture value and an ISO speed in accordance with a metering result so as to achieve proper exposure, and then shooting is performed. In the M mode, the user sets an aperture value, a shutter speed, and an ISO speed, and shooting is performed at an exposure desired by the user.

A first shutter switch 62 is turned on by a so-called half press (standby-for-shooting instruction) and generates a first shutter switch signal SW1 while the shutter button 61 provided on the digital camera 100 is being operated. The first shutter switch signal SW1 causes the operation of an autofocus (AF) process, an automatic exposure (AE) process, an automatic white balance (AWB) process, a pre-flash (EF) process, and so forth to be started. In addition, the AE sensor 17 performs metering.

A second shutter switch 64 is turned on by a so-called full press (shooting instruction), that is, when the operation of the shutter button 61 is completed, and generates a second shutter switch signal SW2. In response to the second shutter switch signal SW2, the system control unit 50 starts a shooting process that starts from reading of a signal from the image capturing unit 22 and ends by writing image data on the recording medium 200.

A power control unit 80 includes a battery detection circuit, a DC-DC converter, and a switch circuit for switching between blocks to which power is to be supplied, and detects whether or not a battery is mounted, the type of battery, and a remaining battery level. Also, the power control unit 80 controls the DC-DC converter on the basis of a result of the detections and an instruction provided from the system control unit 50 and supplies a necessary voltage to individual units including the recording medium 200 for a necessary period of time. The power switch 72 is a switch for turning ON/OFF the power of the digital camera 100.

A power unit 30 includes a primary battery such as an alkaline battery or a lithium battery, a secondary battery such as a NiCd battery, a NiMH battery, or Li battery, an AC adapter, and so forth. A recording medium interface (I/F) 18 is an interface for the recording medium 200 such as a memory card or a hard disk. The recording medium 200 is a memory card or the like on which a captured image is recorded, and may be a semiconductor memory, a magnetic disk, or the like.

The touch screen 70a, which is included in the operation unit 70, is capable of detecting a touch on the display unit 28. The touch screen 70a and the display unit 28 may be integrated with each other. For example, the touch screen 70a has a light transmittance that does not hinder the display of the display unit 28, and is attached on an upper layer of the display surface of the display unit 28. Input coordinates on the touch screen 70a and display coordinates on the display unit 28 are associated with each other. Accordingly, a graphical user interface (GUI) can be configured in which as if the user is able to directly operate the screen displayed on the display unit 28. The system control unit 50 is capable of detecting the following operations performed on the touch screen 70a or the states on the touch screen 70a.

An operation of newly touching the touch screen with a finger or a pen, that is, the start of touch (hereinafter referred to as "touch-down").

A state in which the touch screen is touched by a finger or a pen (hereinafter referred to as "touch-on").

A state in which a finger or a pen is moving on the touch screen (hereinafter referred to as "touch-move").

An operation of moving a finger or a pen away from the touch screen, that is, the end of touch (hereinafter referred to as "touch-up").

A state in which the touch screen is not touched by anything (hereinafter referred to as "touch-off").

When touch-down is detected, touch-on is detected at the same time. After touch-down, touch-on is continuously detected as long as touch-up is not detected. While touch-move is being detected, touch-on is also detected. Even if touch-on is detected, touch-move is not detected if the touched position does not change. After touch-up of all fingers or pens is detected, touch-off is detected. Furthermore, a pressed state in which a pressure of a predetermined value or more is applied to the touch screen may be detected in a touch-on state.

These operations or states and the coordinates of a position at which the touch screen is touched by a finger or a pen are reported to the system control unit 50 through an internal bus, and the system control unit 50 determines which operation has been performed on the touch screen on the basis of the reported information. As for touch-move, a movement direction of a finger or a pen that moves on the touch screen can be determined for each of a vertical component and a horizontal component on the touch screen on the basis of a change in coordinates of the position. A process starting from touch-down and ending with touch-up after constant touch-move is regarded as drawing of a stroke. An operation of quickly drawing a stroke is called a flick. A flick is an operation of quickly moving a finger on the touch screen for a certain distance and then moving the finger away from the touch screen, in other words, an operation of quickly moving a finger on the touch screen so as to flick the finger at the touch screen. If it is detected that touch-move has been performed at a predetermined speed or more for a predetermined distance or more and then touch-up is detected immediately after that, it is determined that a flick has been performed. If it is detected that touch-move has been performed at less than the predetermined speed for the predetermined distance or more, it is determined that dragging has been performed. The touch screen may be of any type, for example, a resistive touch screen, a capacitive touch screen, a surface acoustic wave touch screen, an infrared touch screen, an electromagnetic induction touch screen, an image recognition touch screen, or an optical sensor touch screen. Depending on the type, a touch on the touch screen is detected in response to a touch on the touch panel or in response to an approach of a finger or a pen to the touch screen, but any type of touch screen may be used.

Figure 3:
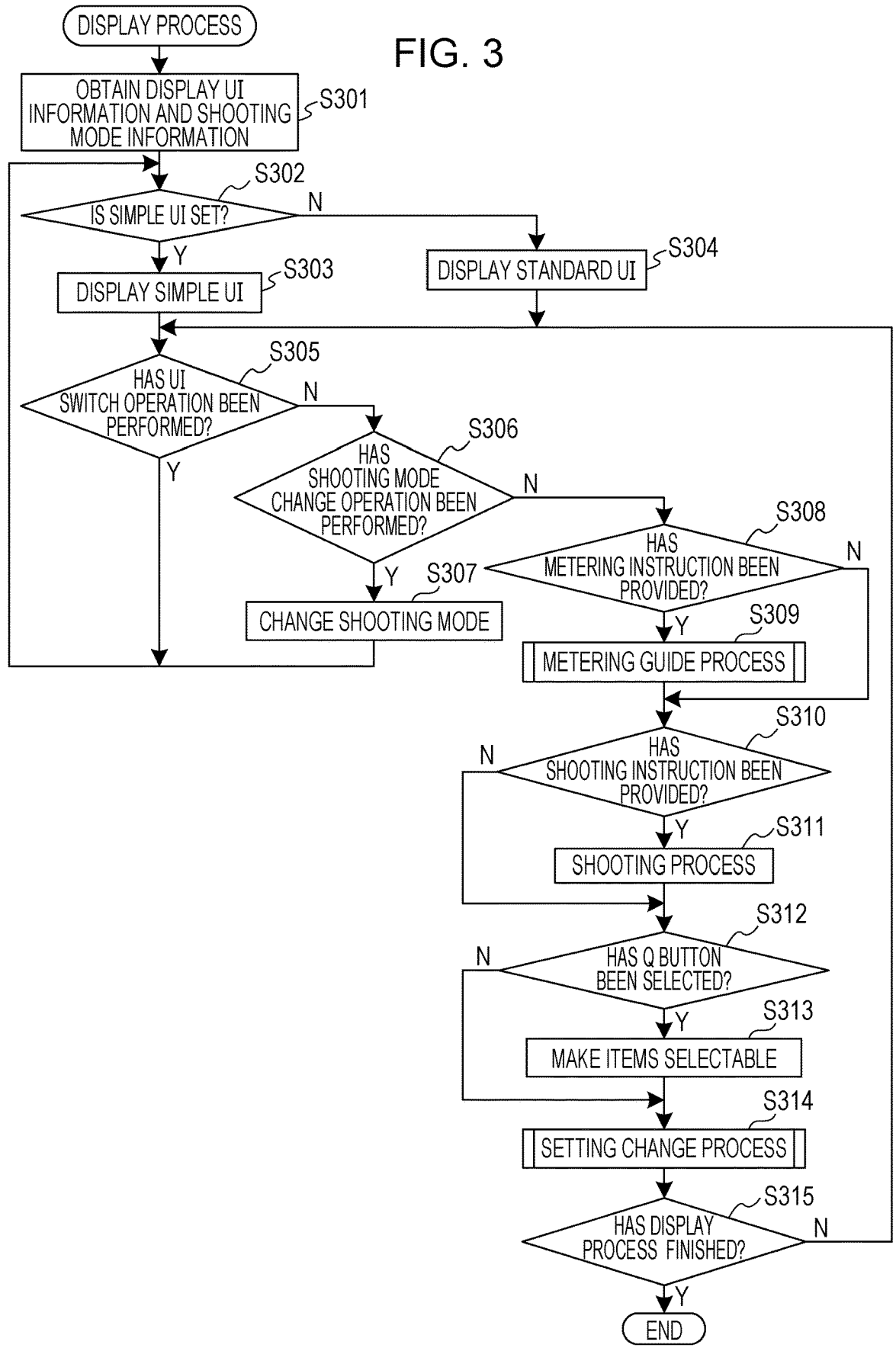
FIG. 3 is a flowchart illustrating a display process in a display user interface (UI).

Next, a description will be given of a display process in a display user interface (UI) according to the exemplary embodiment with reference to FIG. 3. This process is implemented by the system control unit 50 executing a program that is recorded in the nonvolatile memory 56 and loaded to the system memory 52. This process starts when the power of the digital camera 100 is turned on and when it becomes possible to display a shooting screen (a list screen of setting items or a setting screen) on the display unit 28 or when the mode changes from the playback mode to the shooting mode in response to an operation of the playback button.

In step S301, the system control unit 50 obtains current display UI information (display mode information) and shooting mode information from the nonvolatile memory 56. The display UI information includes information about a current display UI that is set by a user. In the exemplary embodiment, the user is allowed to select either of a simple UI and a standard UI. The simple UI is a display UI that enables a user at an introductory level to easily operate the digital camera 100. The standard UI is a display UI for a user who has stepped up from an introductory level. The shooting mode information includes a current shooting mode that is set by using the mode selection switch 60 or the like.

In step S302, the system control unit 50 determines whether or not the simple UI is set as the display UI for the current shooting screen (display screen). If the system control unit 50 determines that the simple UI is set as the display UI, the process proceeds to step S303. Otherwise, the process proceeds to step S304.

Figure 9A:
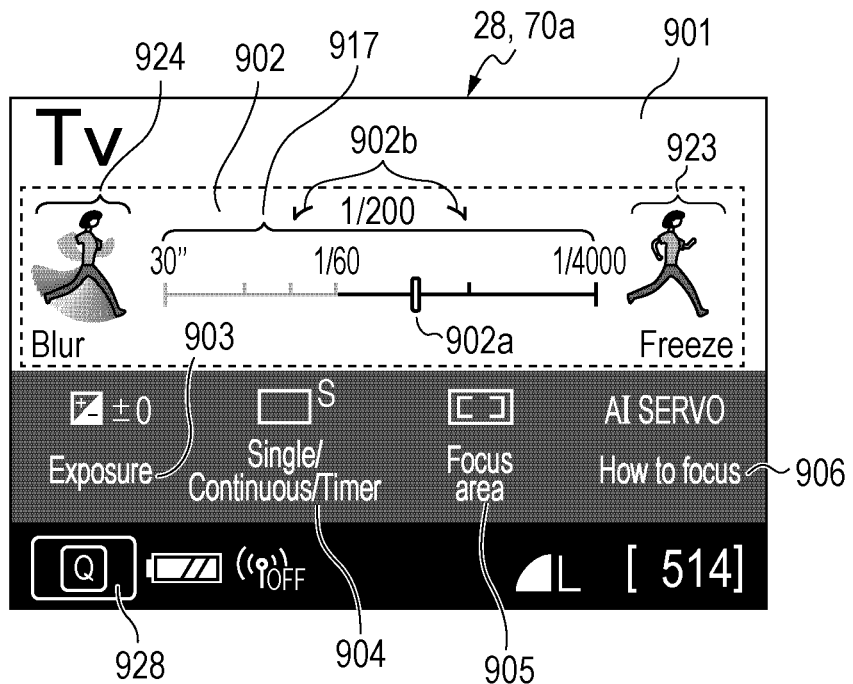
FIGS. 9A to 9H illustrate display examples of a shooting screen of the simple UI in a Tv mode.
Figure 9B:
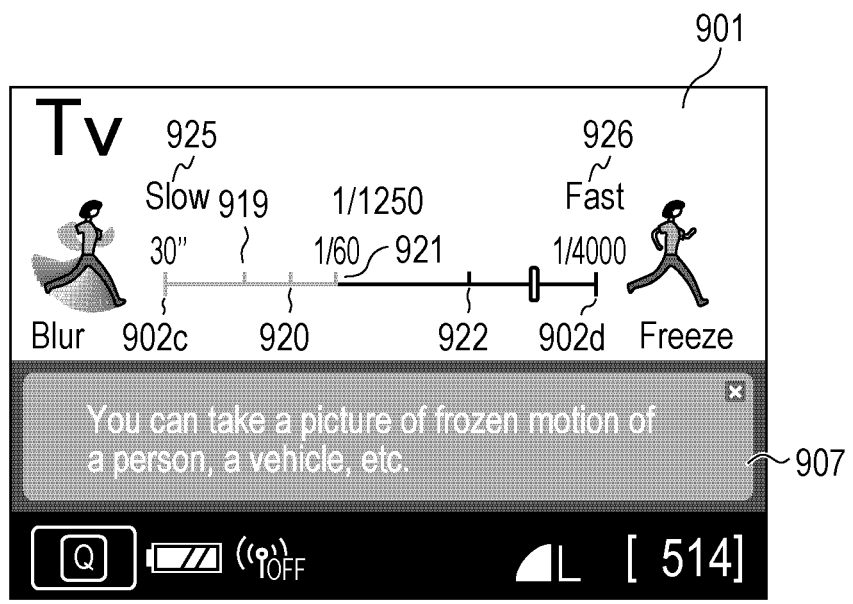

In step S303, the system control unit 50 displays, on the basis of the shooting mode information obtained in step S301, the simple UI for the shooting screen of the shooting mode that is set. The display of the simple UI will be described with reference to FIGS. 9A to 11B. A setting screen 901 in FIG. 9A is a display example of the shooting screen of the simple UI in the Tv mode. In FIG. 9A, an item 902 represents shutter speed, and an indicator 902a on a bar 917 of the item 902 indicates a set value. The bar 917 of the item 902 is equivalent to the information that is displayed when shutter speed is selected on the shooting screen of the standard UI and when the screen changes to a subscreen. In the simple UI, the bar 917 is displayed before the screen changes to a subscreen. An item 903 represents exposure compensation, an item 904 represents a drive mode, an item 905 represents a ranging area selection mode, and an item 906 is for setting an AF operation. The items 903 to 906 in FIG. 9A each include a mark representing a set value. For example, the item 903 in FIG. 9A indicates that the exposure compensation is set at ±0. In the simple UI, the bar for setting a value, such as the item 902, is displayed even if the user does not perform an operation of selecting a main setting item, and thus the user can understand that he/she may change a set value of the shutter speed in the Tv mode. At an end on the high shutter speed side of the bar 917 of the item 902, an illustration of a person whose motion is frozen and a guidance 923 (explanation) including a character string (sentence) "freeze" are displayed. At an end on the low shutter speed side, an illustration of a person whose motion is blurred and a guidance 924 including a character string "blur" are displayed. In addition, during an operation of setting a shutter speed (dial operation or touch operation), an item 926 representing "fast" is displayed on the high shutter speed side, and an item 925 representing "slow" is displayed on the low shutter speed side, as illustrated in FIG. 9B.

Figure 10A:
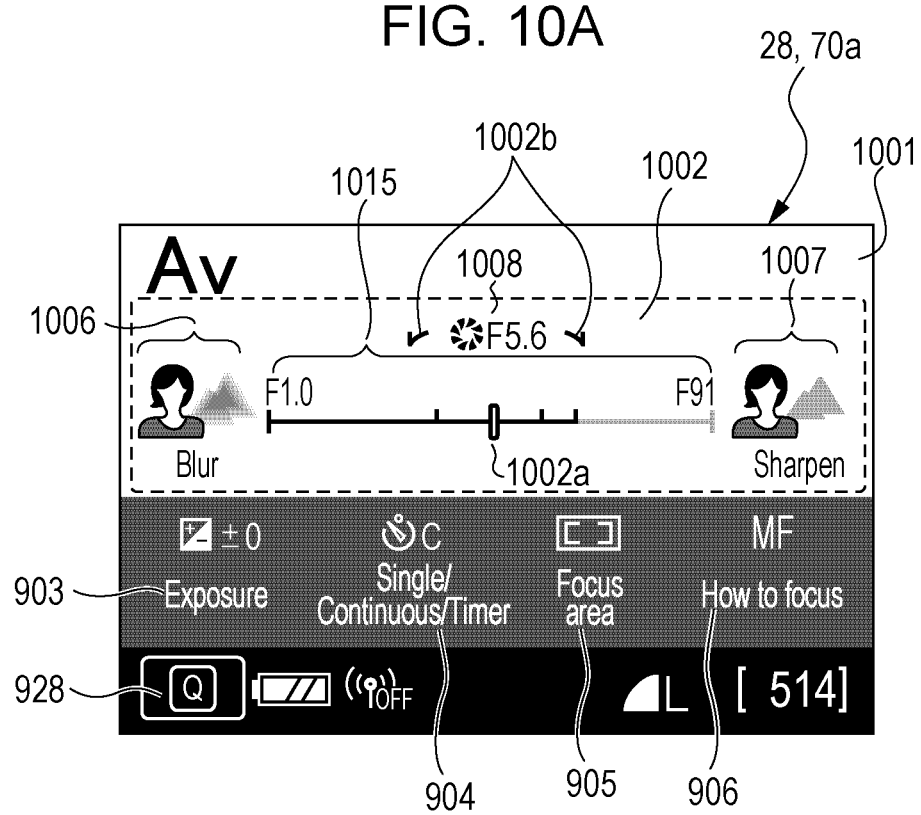
FIGS. 10A to 10F illustrate display examples of a shooting screen of the simple UI in an Av mode.
Figure 10B:
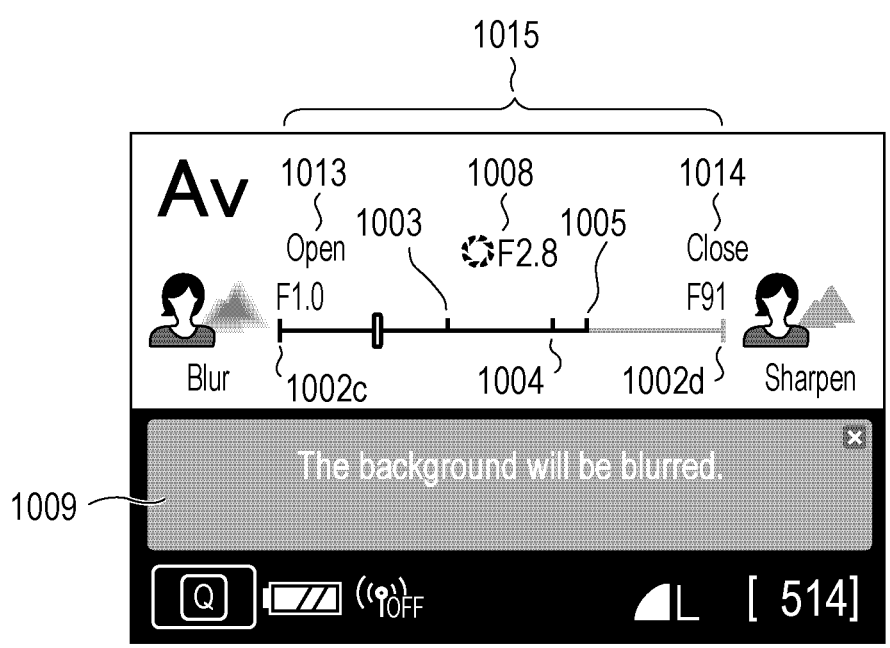

Next, a description will be given of the shooting screen in the Av mode. A setting screen 1001 in FIG. 10A is a display example of the shooting screen of the simple UI in the Av mode. In FIG. 10A, unlike in FIG. 9A, the main setting item is aperture value and thus an item 1002 includes a bar 1015 for setting an aperture value. On the setting screen 1001 in FIG. 10A, items 903 to 906 are displayed as in the Tv mode. At an end on the small aperture value (open) side of the bar 1015 of the item 1002, an illustration in which the outline of a subject is blurred and a guidance 1006 including a character string "blur" are displayed. At an end on the large aperture value side, an illustration in which the outline of a subject is sharp and a guidance 1007 including a character string "sharpen" are displayed. A numeral representing a set value (F5.6 in FIG. 10A) is displayed together with an item 1008 representing an aperture. For example, if the aperture value becomes closer to the smallest value, the display format of the item 1008 is changed, that is, a larger aperture hole is displayed as illustrated in FIG. 10B. In addition, during an operation of setting an aperture value (dial operation or touch operation), a guidance 1013 including a character string "open" is displayed on the small aperture value side of the bar 1015 as illustrated in FIG. 10B. On the large aperture value side, a guidance 1014 including a character string "close" is displayed. That is, the names related to set aperture values are displayed.

Figure 11A:
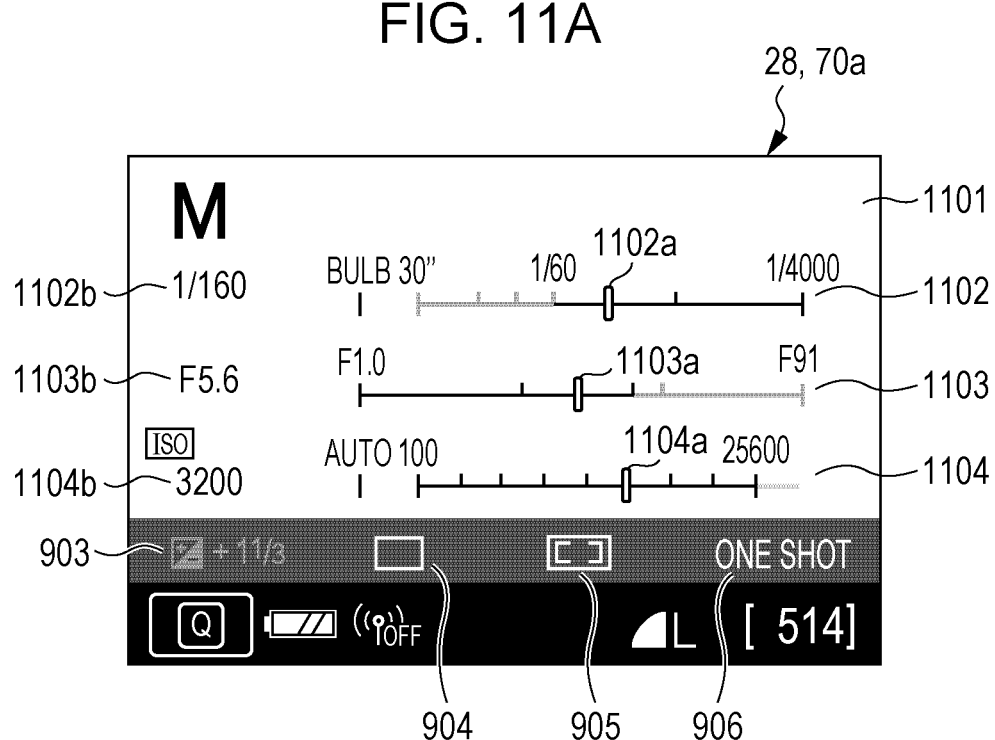
FIGS. 11A and 11B illustrate display examples of a shooting screen of the simple UI in an M mode.

Next, a description will be given of the shooting screen in the M mode. A setting screen 1101 in FIG. 11A is a display example of the shooting screen of the simple UI in the M mode. In FIG. 11A, unlike in FIGS. 9A and 10A, the number of main setting items is not one, that is, the main setting items are shutter speed, aperture value, and ISO speed. In the M mode, an item 1102 representing shutter speed, an item 1103 representing aperture value, and an item 1104 representing ISO speed are displayed, and also items 903 to 906 are displayed as in the Tv mode and the Av mode. The items 1102 to 1104 are displayed together with set values (1102b to 1104b) and respective bars. Indicators 1102a to 1104a on the bars indicate the set values. In this way, the bars of three items are displayed on the shooting screen in the M mode. In addition, the background of the shooting screen of the simple UI is displayed in a white-based popular color (color tone).

Figure 12A:
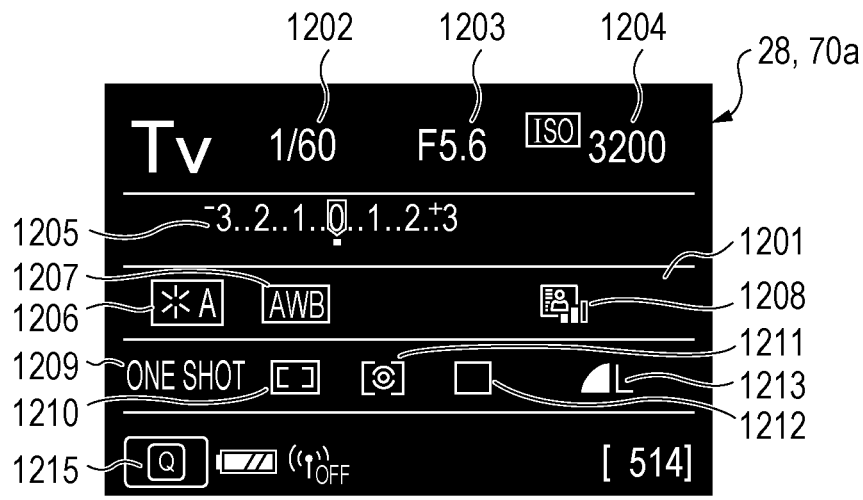
FIGS. 12A to 12E illustrate setting screens of a standard UI in the Tv mode and the Av mode.
Figure 12B:
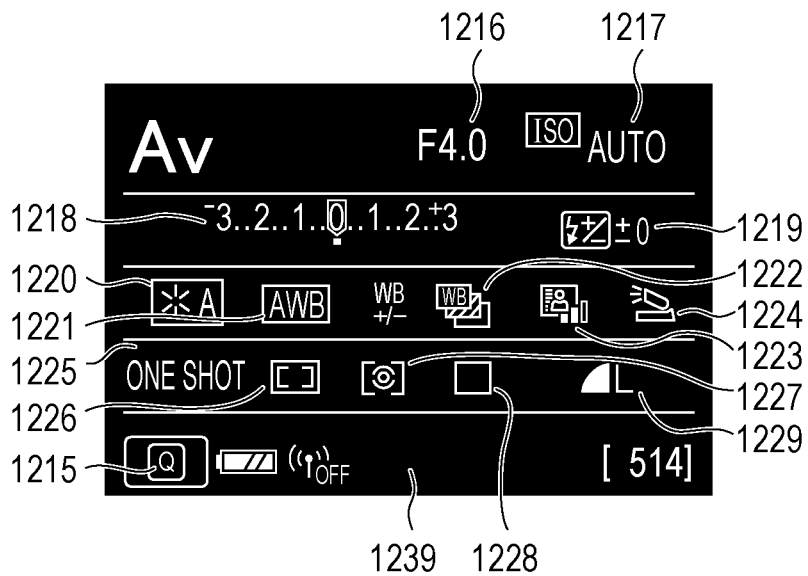
Figure 12C:
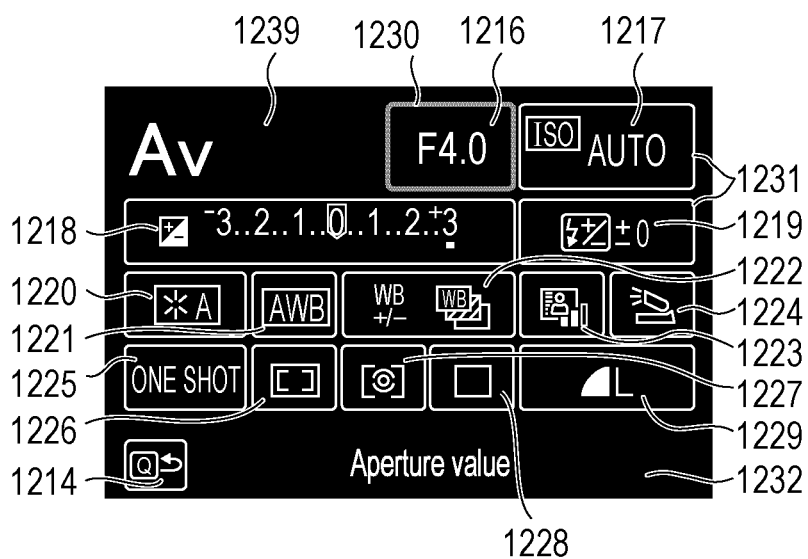

In step S304, the system control unit 50 displays, on the basis of the shooting mode information obtained in step S301, the standard UI for the shooting screen of the shooting mode that is set. The display of the standard UI will be described with reference to FIGS. 12A and 12B. A setting screen 1201 in FIG. 12A is a setting screen of the standard UI in the Tv mode, and a setting screen 1239 in FIG. 12B is a setting screen of the standard UI in the Av mode. On the setting screen 1201, twelve items 1202 to 1213 representing set values are displayed. On the setting screen 1239, fourteen items 1216 to 1229 representing set values are displayed. Specifically, the item 1202 represents a shutter speed, the item 1203 (1216) represents an aperture value, the item 1204 (1217) represents an ISO speed, the item 1205 (1218) represents exposure compensation, and the item 1219 represents light control. The item 1206 (1220) represents a picture style, the item 1207 (1221) represents a white balance, the item 1222 represents white balance correction, and the item 1208 (1223) represents an auto lighting optimizer. The item 1224 represents a built-in strobe setting, the item 1209 (1225) represents an AF mode, and the item 1210 (1226) represents a ranging area selection mode. The item 1211 (1227) represents a metering mode, the item 1212 (1228) represents a drive mode, and the item 1213 (1229) represents image quality. As illustrated in FIGS. 12A and 12B, if a Q button 1215 is pressed on the screen including these items, the set values represented by the individual items become changeable. That is, if the user presses the Q button 1215 on the setting screen 1239 in FIG. 12B and if the individual set values become changeable, a cursor 1230 is placed on a selected item as in the setting screen 1239 in FIG. 12C, and frames 1231 are placed on the other items. A guidance 1232 is displayed for the item indicated by the cursor 1230. If an item 1214 (back button) in FIG. 12C is pressed, the state where each item is selectable is cancelled, and the set value list screen is displayed. After the Q button 1215 is pressed, a cursor is placed on an item representing a main setting item (the item 1202 in the Tv mode, the item 1216 in the Av mode). The background of the standard UI is displayed in a black-based color.

Figure 8A:
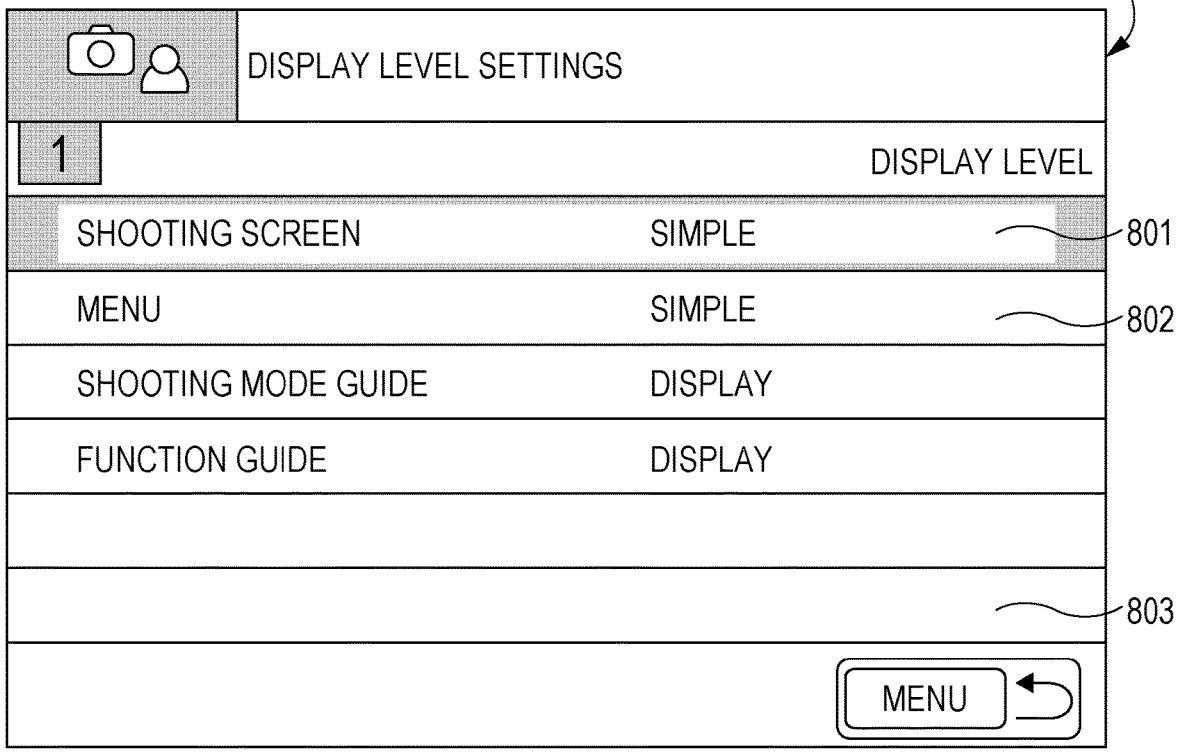
FIGS. 8A to 8C illustrate setting screens for a display UI on a menu screen.
Figure 8B:
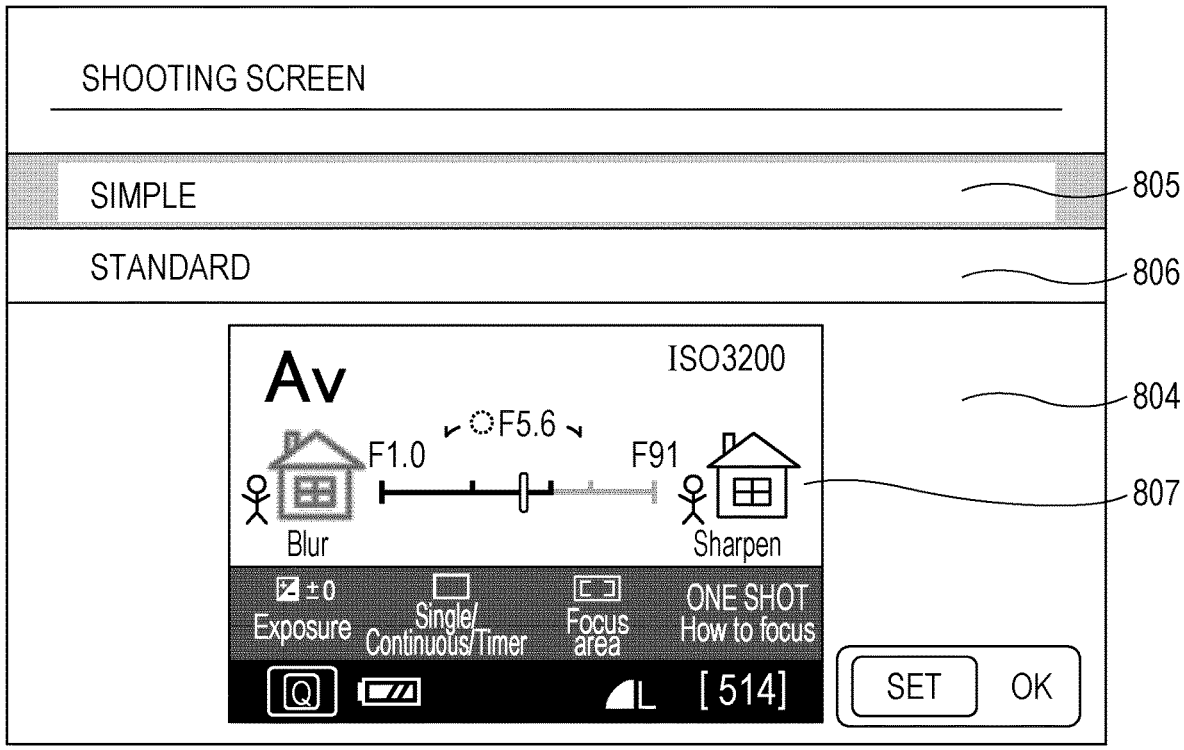
Figure 8C:
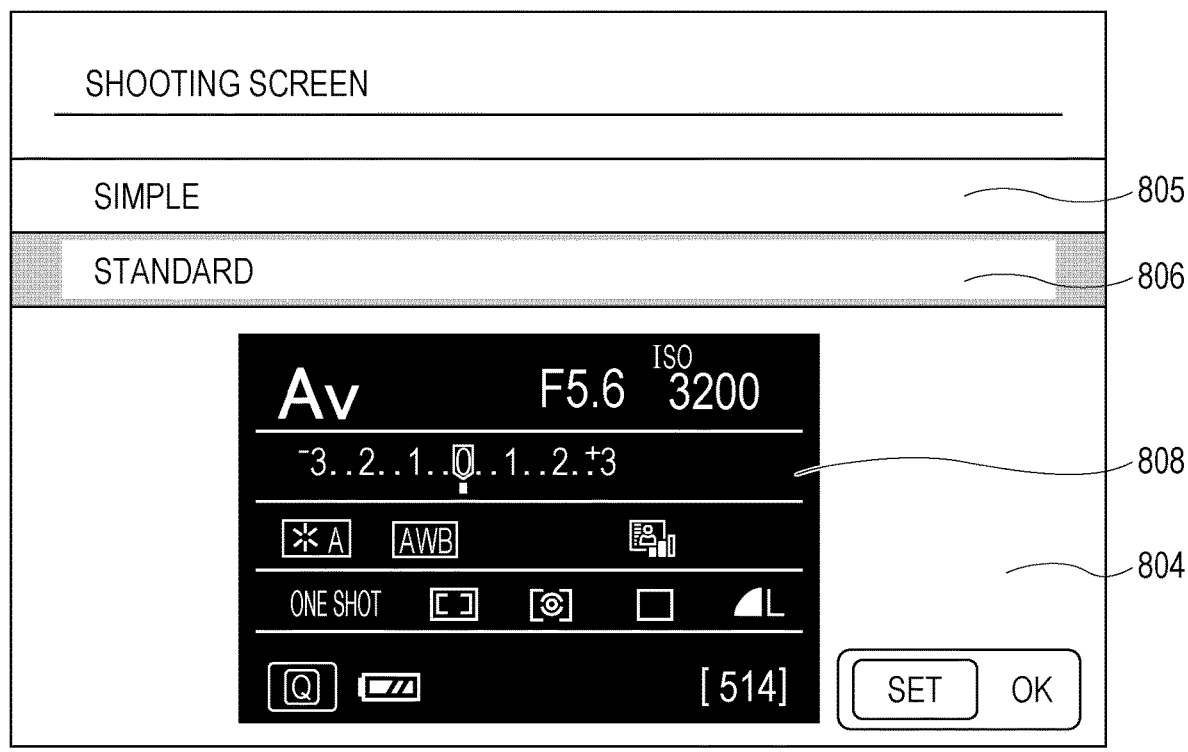

In step S305, the system control unit 50 determines whether or not an operation of switching between the simple UI and the standard UI for the shooting screen has been performed. The operation of switching the display UI can be performed on a menu screen that is displayed by pressing a menu button. FIGS. 8A to 8C illustrate setting screens for the display UI on the menu screen. On a display level setting screen 803 in FIG. 8A, a display UI can be set, that is, a display UI for the shooting screen that displays a list of setting items regarding shooting and a display UI for displaying a menu can be set. On the display level setting screen 803, a menu item 801 for setting a display UI for the shooting screen and a menu item 802 for setting a display UI for displaying a menu are displayed. If the menu item 801 is selected, a display UI setting screen 804 for the shooting screen illustrated in FIG. 8B or 8C is displayed. A menu item 805 is an item for setting the simple UI, and a menu item 806 is an item for setting the standard UI. When a cursor is placed on the menu item 805, a display sample 807 is displayed. When a cursor is placed on the menu item 806, a display sample 808 is displayed. The display UI for displaying a menu can also be switched between the simple UI and the standard UI, but a description will be given mainly of the display UI for the shooting screen in the following exemplary embodiments. The display UI for the shooting screen and the display UI for displaying a menu that have been set are stored in the nonvolatile memory 56. If the system control unit 50 determines that the display UI for the shooting screen has been switched, the process returns to step S302. Otherwise, the process proceeds to step S306.

In step S306, the system control unit 50 determines whether or not a shooting mode change operation has been performed. The shooting mode can be changed by rotating the mode selection switch 60 or by performing an operation on the menu screen. If the system control unit 50 determines that a shooting mode change operation has been performed, the process proceeds to step S307. Otherwise, the process proceeds to step S308.

In step S307, the system control unit 50 changes the shooting mode to the shooting mode that is set in step S306, and records the shooting mode in the nonvolatile memory 56. Also, the system control unit 50 updates the UI display in accordance with the changed shooting mode (step S303 or S304).

In step S308, the system control unit 50 determines whether or not a metering instruction has been provided. A metering instruction can be provided by pressing the shutter button 61 halfway. Alternatively, a metering instruction can be provided by pressing an AE lock button (a button for fixing exposure) or a depth-of-field preview button (a button for checking the depth of field before shooting), which are not illustrated. If the system control unit 50 determines that a metering instruction has been provided, the process proceeds to step S309 after metering has been completed. Otherwise, the process proceeds to step S310.

In step S309, the system control unit 50 performs a metering guide process. The metering guide process will be described below with reference to FIG. 7.

In step S310, the system control unit 50 determines whether or not a shooting instruction has been provided. A shooting instruction can be provided by fully pressing the shutter button 61. If the system control unit 50 determines that a shooting instruction has been provided, the process proceeds to step S311. Otherwise, the process proceeds to step S312. If the process proceeds to step S310 after a metering instruction is provided in step S308 by an operation other than a half press of the shutter button 61, a metering process is not performed even if the shutter button 61 is pressed halfway.

In step S311, the system control unit 50 performs a shooting process in accordance with the settings that have been made in a setting change process (including a set value change process in the simple UI), which will be described below. In step S311, the system control unit 50 performs shooting at an exposure and an AF position that are based on the metering result obtained in step S309. In accordance with a set value, an image in which the background is blurred or an image in which the motion of the subject is blurred can be obtained.

In step S312, the system control unit 50 determines whether or not the Q button has been selected. The Q button can be selected by touching the Q button displayed on the screen (for example, an item 928 representing the Q button in FIG. 9A) or by pressing the Q button 76. If the system control unit 50 determines that the Q button has been selected, the process proceeds to step S313. Otherwise, the process proceeds to step S314.

In step S313, the system control unit 50 makes the items displayed on the shooting screen selectable. For example, when the simple UI is displayed in the Tv mode, the system control unit 50 changes the state where the individual items are arranged as illustrated in FIG. 9A to the state where the set values represented by the individual items are changeable as illustrated in FIG. 9G. In this state, a cursor 912 is placed on the selected item and frames 927 are placed on the other items, as illustrated in FIG. 9G. The indicator 902*a* indicating the current set value included in the item 902 in FIG. 9A corresponds to a cursor 918 in FIG. 9G. The cursor 918 has a contrasting color such as orange or green relative to the white-based color of the background of the setting screen 901. When the simple UI is displayed in the Av mode, the display format of the items on the shooting screen is changed from that in FIG. 10A to that in FIG. 10F. When the standard UI is displayed in the Av mode, the display format is changed from that in FIG. 12B to that in FIG. 12C.

In step S314, the system control unit 50 performs a setting change process. The setting change process will be described below with reference to FIG. 4.

In step S315, the system control unit 50 determines whether or not the display process of the display UI has finished. The display process of the display UI is finished by turning off the power, displaying a live view screen (a live view image or a captured image) on the display unit 28, or shifting to the playback mode.

According to the exemplary embodiment described above with reference to FIG. 3, the user can switch between the simple UI and the standard UI. The shooting screen of the simple UI includes a bar for setting a value for a main setting item in each mode (a shutter speed in the Tv mode, and an aperture value in the Av mode), and thus the user can understand the setting item for which the set value is to be changed in a selected mode. That is, the bar displayed on the shooting screen of the simple UI has the same function as the bar displayed on a subscreen that is displayed after an item is selected on the shooting screen in the standard UI described below with reference to FIG. 4. The main setting item varies according to a selected shooting mode. However, in the simple UI, a bar for changing a set value of the main setting item in each shooting mode and a guidance are displayed in a large size on the shooting screen, so that the user can learn the shooting mode. Furthermore, the user can understand which is a set value to be changed, without memorizing setting items represented by individual items and determining a main setting item from a list of items. Furthermore, the user can know which set value has which effect on an image to be captured. On the other hand, a user who is skilled in handling the camera can quickly change set values of more items by using the standard UI, and thus the operability increases.

In the simple UI, the number of items that are displayed is smaller than in the standard UI, and a guidance is displayed for each item. Thus, the simple UI is easy to use for a user who does not know well what is represented by each item and which item is to be selected to change a set value. The setting items that are displayed in both the simple UI and the standard UI include a main setting item, exposure compensation, drive mode, ranging area selection mode, and AF operation. If the user gets used to using these setting items in the simple UI, the user can easily step up to the standard UI.

There is a common operability between the simple UI and the standard UI, that is, a set value of a main setting item can be changed by a dial operation when the shooting screen is displayed, the display format of each icon is the same, selecting of the Q button enables a set value represented by each item to be changeable, and a subscreen described below is the same. Thus, a user who has learned by using the simple UI for a while can smoothly step up to the standard UI.

Figure 4:
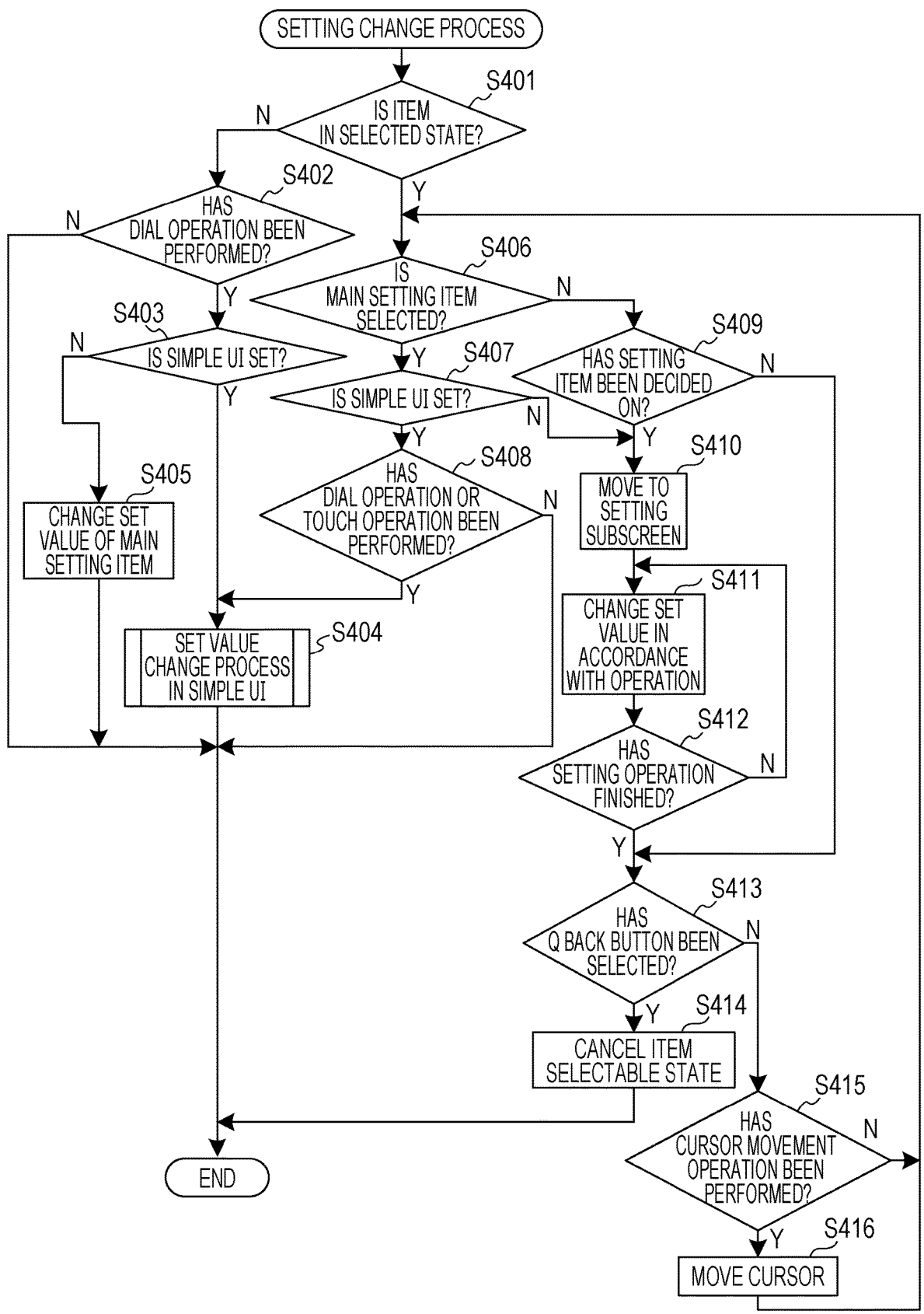
FIG. 4 is a flowchart illustrating a setting change process.

Next, a description will be given of the setting change process with reference to FIG. 4. This process is implemented by the system control unit 50 executing a program that is recorded in the nonvolatile memory 56 and loaded to the system memory 52. This process starts when the process proceeds to step S314 in FIG. 3.

In step S401, the system control unit 50 determines whether or not an item displayed on the shooting screen is in a selected state. That is, the system control unit 50 determines whether the items displayed on the shooting screen are in a state where the frame 927 or the cursor 912 is placed thereon as in FIG. 9G (selected state) or in a state where neither a frame nor a cursor is placed thereon as in FIG. 9A. If the system control unit 50 determines that an item is in a selected state, the process proceeds to step S406. Otherwise, the process proceeds to step S402.

In step S402, the system control unit 50 determines whether or not a dial operation has been performed. The dial operation is an operation of the main electronic dial 71 or the sub electronic dial 73. If the system control unit 50 determines that a dial operation has been performed, the process proceeds to step S403. Otherwise, the setting change process ends.

In step S403, the system control unit 50 determines whether or not the display UI that is currently set is the simple UI. If the system control unit 50 determines that the display UI that is currently set is the simple UI, the process proceeds to step S404. Otherwise, the process proceeds to step S405.

In step S404, the system control unit 50 performs a set value change process in the simple UI. The set value change process in the simple UI will be described below with reference to FIG. 5.

In step S405, that is, if it is determined in step S402 that a dial operation has been performed and if the display UI determined in step S403 is the standard UI, the system control unit 50 changes the set value of a main setting item. The main setting items is an item determined for each shooting mode, that is, shutter speed in the Tv mode, aperture value in the Av mode, exposure level in the P mode, and shutter speed, aperture value, and ISO speed in the M mode. In the Tv mode, the Av mode, and the P mode, the set value of the main setting item can be changed by either the main electronic dial 71 or the sub electronic dial 73. In the M mode, a shutter speed is changed by operating the main electronic dial 71 and an aperture value is changed by operating the sub electronic dial 73. With a dial operation being performed, the value of the shutter speed represented by the item 1202 in FIG. 12A is changed in the Tv mode, and the aperture value represented by the item 1216 in FIG. 12B is changed in the Av mode.

In step S406, the system control unit 50 determines whether or not the main setting item is selected. If the set button 75 is pressed or touched with a cursor being placed on the main setting item, the main setting item is selected. Otherwise, the main setting item is not selected. If the system control unit 50 determines that the main setting item is selected, the process proceeds to step S407. Otherwise, the process proceeds to step S409.

Figure 10C:
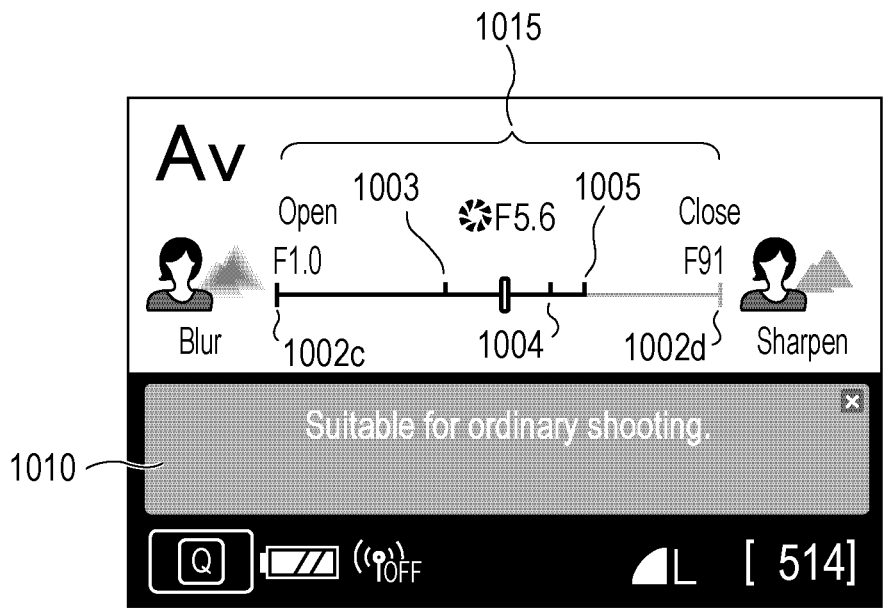
Figure 10D:
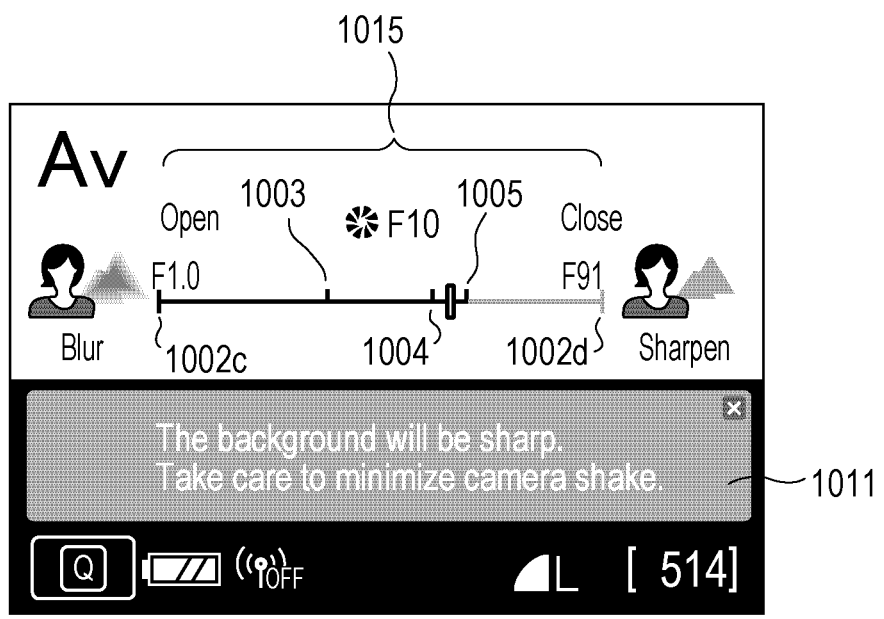
Figure 10E:
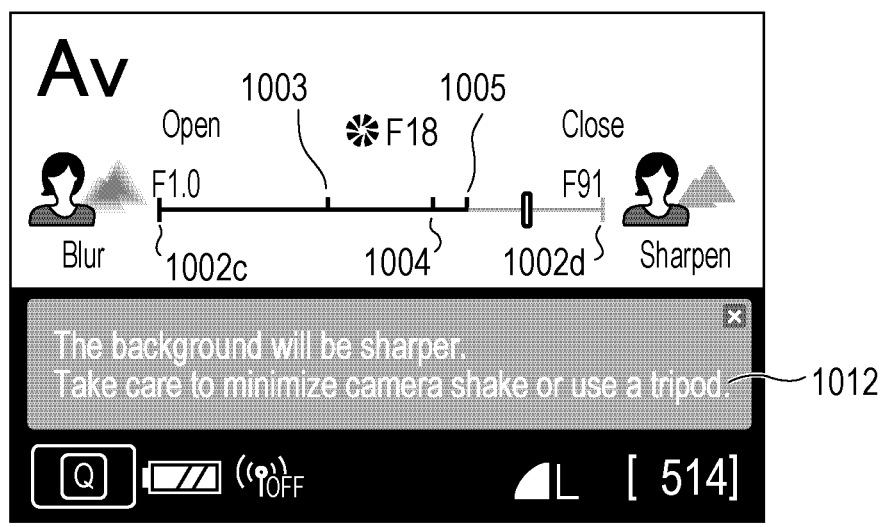
Figure 10F:
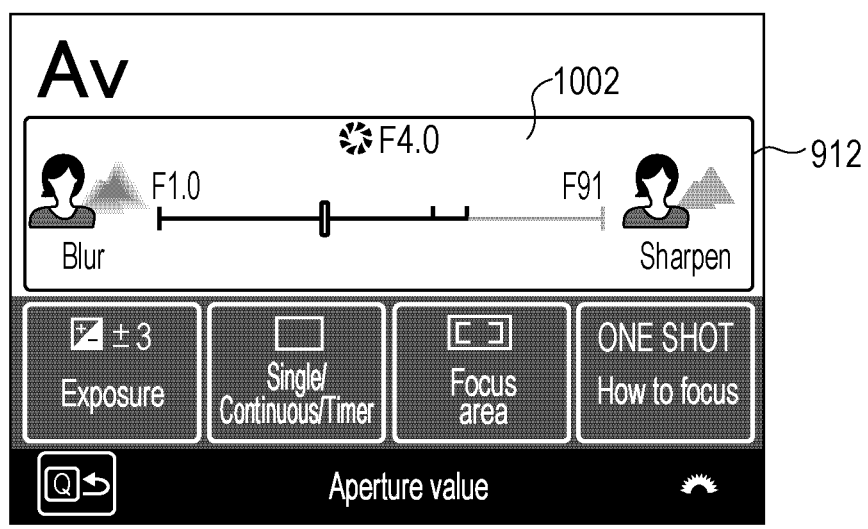
Figure 11B:
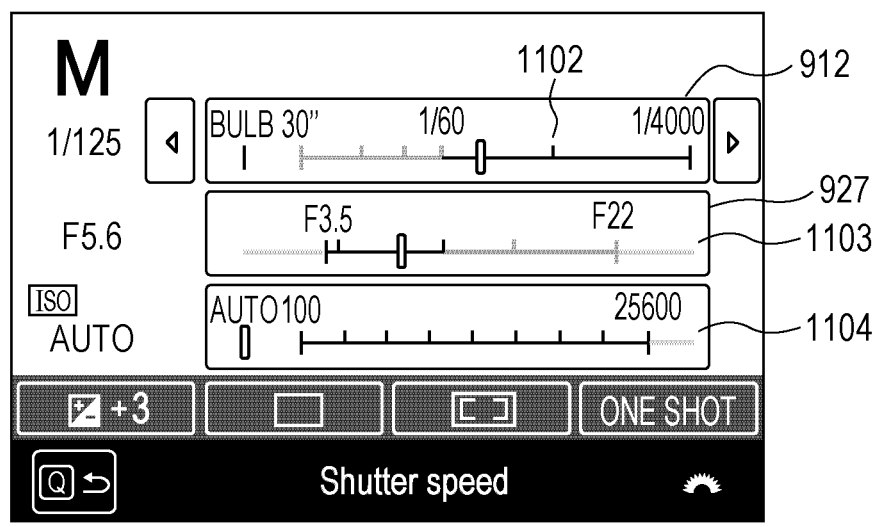

In step S407, the system control unit 50 determines whether or not the display UI that is currently set is the simple UI. If the system control unit 50 determines that the display UI that is currently set is the simple UI, the process proceeds to step S408. Otherwise, the process proceeds to step S410. If the main setting item is selected in the simple UI, the set value can be changed without moving to a subscreen. On the other hand, if a setting item other than the main setting item is selected in the simple UI or in the case of the standard UI, it is necessary to move to the subscreen to change the set value after the setting item is selected (after a cursor is placed). If the main setting item is selected in the simple UI and if the shooting mode is the Av mode, the cursor 912 is placed on the item 1002 representing the main setting item, as illustrated in FIG. 10F. If the shooting mode is the M mode, the cursor 912 is placed on the item 1102 representing shutter speed, which is one of the main setting items, as illustrated in FIG. 11B. In the simple UI, the setting of the main setting item can be changed by a dial operation when setting items are in a deselected state (S402 to S405). It is impossible to change the setting by a touch operation. However, if a positive determination is made in steps S406 and S407, the setting can be changed by a touch operation. If a dial operation is performed when the main setting item is in a selected state, the setting of the selected setting item is changed.

In step S408, the system control unit 50 determines whether or not a dial operation or a touch operation on a bar of an item representing the main setting item has been performed. A touch or a touch-move operation on the bar 917 of the item 902 in FIG. 9G enables the position of the cursor 918 to be changed. If the system control unit 50 determines that a dial operation or a touch operation on the bar 917 has been performed, the process proceeds to step S404. Otherwise, the setting change process ends. Both the dial operation and the touch operation on the bar are operations of designating a position on the bar on the display unit 28. With this operation, a candidate value corresponding to the designated position is selected. The individual positions on the bar and candidate values are associated with each other. By designating a position in a dial operation or a touch operation, a value corresponding to the position can be set.

In step S409, the system control unit 50 determines whether or not an operation of deciding on a setting item has been performed. When an item is in a selected state with a cursor thereon, a touch operation or a press of the set button 75 causes the item to be decided on. If the system control unit 50 determines that an operation of deciding on a setting item has been performed, the process proceeds to step S410. Otherwise, the process proceeds to step S413.

Figure 12D:
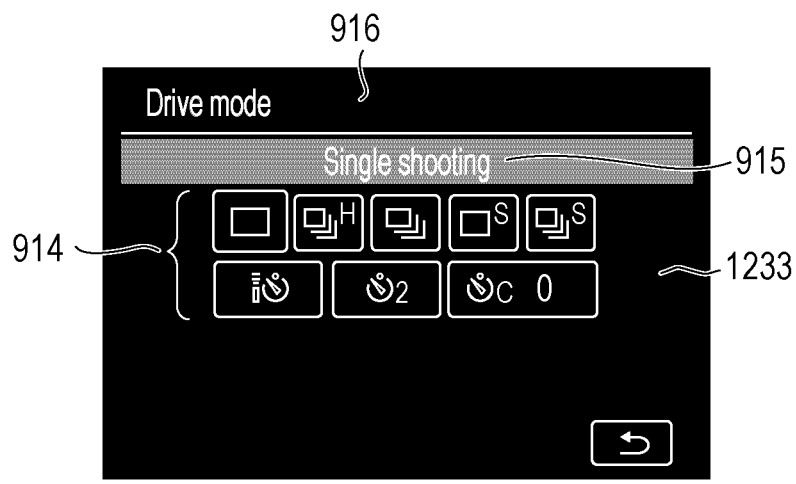

In step S410, the system control unit 50 displays a setting subscreen for the selected setting item. Step S410 is performed if a determination result is "NO" in steps S406 and S407. That is, the setting subscreen is displayed if a setting item other than the main setting item is selected in the simple UI or if a setting item is selected in the standard UI. In the case of the simple UI, if the setting item represented by the item 904 is selected, for example, a setting subscreen 913 in FIG. 9H is displayed on the display unit 28. In the case of the standard UI, if the item 1212 in FIG. 12A is selected as a setting item, for example, a setting subscreen 1233 in FIG. 12D is displayed on the display unit 28. Both in the setting subscreen of the simple UI (FIG. 9H) and the setting subscreen of the standard UI (FIG. 12D), an item group 914 representing set values, a setting item name 915, and a set value name 916 are displayed. The arrangement of the items in the item group 914, the setting item that is displayed (setting item name 915), and the name of the set value (set value name 916) are the same in the simple UI and the standard UI. The color or color combination is different between the simple UI and the standard UI, that is, white is used in the simple UI whereas nearly black is used in the standard UI. Only the color used for display is different but the arrangement of items and the name of the setting item are the same. Accordingly, if a user who has been using the simple UI changes the UI to the standard UI, the user can smoothly perform a setting change operation.

Figure 12E:
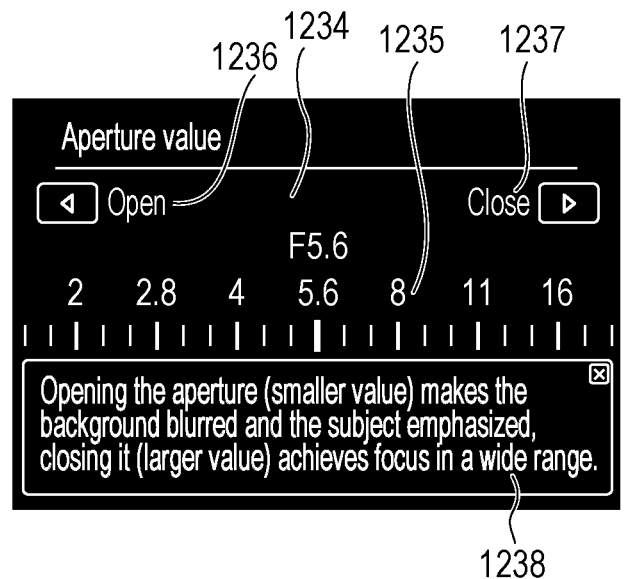

A description will be given of a case where a setting item as a main setting item is selected in each shooting mode and then the screen changes to a subscreen in the standard UI. FIG. 12E illustrates a display example in a case where the aperture value (item 1216) is selected and the screen changes to a subscreen in the Av mode. On a setting screen 1234 for the aperture value illustrated in FIG. 12E, a bar 1235 is displayed, and also items 1236 and 1237 related to values such as "open" and "close" are displayed. In addition, a guidance 1238 is displayed. The guidance 1238 relates to the aperture value and indicates "opening the aperture (smaller value) makes the background blurred and the subject emphasized, closing it (larger value) achieves focus in a wide range". The guidance 1238 is given about the setting item regardless of a set value. The bar 1235 includes tick marks representing settable positions corresponding to settable values, which are located at a predetermined interval. The items 1236 and 1237 are guidances about an aperture value to be set (different from a guidance about an effect), like the guidances 1013 and 1014 displayed together with the item 1002 on the setting screen of the simple UI in the Av mode (FIG. 10B).

In step S411, the system control unit 50 changes the set value in accordance with the setting operation performed in the setting subscreen displayed in step S410. For example, if an item 914*a* in the item group 914 is selected by being touched or being specified with a cursor on the subscreen in FIG. 9H, the set value is changed. Both in the setting subscreen 913 in FIG. 9H, which is a setting subscreen of the simple UI, and in the setting subscreen 1233 in FIG. 12D, which is a setting subscreen of the standard UI, a set value can be changed by selecting a value from the item group 914. If a setting is changed in the setting subscreen of the standard UI illustrated in FIG. 12E, the display format of the item 1216 in FIG. 12C is changed from that representing F4.0 to, for example, that representing F5.6.

In step S412, the system control unit 50 determines whether or not the operation of setting a value has finished in the setting subscreen displayed in step S410. If a set value is selected and then the set button 75 is pressed or a Q back button 929 is touched, it is determined that the operation of setting a value has finished. If the system control unit 50 determines that the setting operation has finished, the process proceeds to step S413. Otherwise, the process returns to step S411. The value that has been set in the setting subscreen is reflected in the setting screen 901. For example, if the item 914*a* is selected in the setting subscreen 913, the display format of the item 904 in FIG. 9A is changed to the display format of the item 904 in FIG. 9G (the display format of the item 914*a*). The display performed in step S412 is the same also in the standard UI.

In step S413, the system control unit 50 determines whether or not the Q back button has been selected. The Q back button can be selected by touching a displayed item representing the Q back button (for example, the Q back button 929 in FIG. 9G) or pressing the Q button 76. If the system control unit 50 determines that the Q back button has been selected, the process proceeds to step S414. Otherwise, the process proceeds to step S415.

In step S414, the system control unit 50 cancels the item selectable state. Upon the Q back button being selected, the state where individual items are selectable is cancelled and a set value list screen is displayed. That is, the state changes from a state where a cursor and frames are displayed as in FIG. 9G or 12C to a state where a cursor and frames are not displayed as in FIG. 9A or 12B.

In step S415, the system control unit 50 determines whether or not a cursor movement operation has been performed. The cursor movement operation (an operation of changing a selected setting item) is an operation of changing a selected setting item by pressing the upper, lower, left, or right portion of the cross key 74 or an operation of touching a setting item that is not in a selected state and displayed on the shooting screen. If a cursor is moved by operating the cross key 74 and then the set button 75 is pressed, a setting item can be decided on. In the simple UI, a selected item can be changed by moving the cursor 912 in FIG. 9G from the item 902 to the item 904, for example. In the standard UI, the drive mode can be selected as a setting item by moving the cursor 1230 in FIG. 12C from the item 1216 to the item 1228. Both in the simple UI and the standard UI, a setting item can be selected by touching an item representing the setting item. If the system control unit 50 determines that an operation of changing a setting item has been performed, the process proceeds to step S416. Otherwise, the process returns to step S406.

In step S416, the system control unit 50 moves the cursor. The movement of the cursor is, for example, a change from a state where the cursor is on the item 902 in FIG. 9G to a state where the cursor is on the item 904 but not on the item 902. In each step of the flowchart illustrated in FIG. 4, a shooting instruction or a metering instruction can be received.

In the exemplary embodiment described above with reference to FIG. 4, the user who has selected the simple UI can easily change a set value of a main setting item. In each mode, the main setting item is displayed together with a bar for changing the setting even if the user does not perform an operation of selecting a setting item (displayed as a setting region). Regarding the setting items other than the main setting item, a bar is not displayed before the screen changes to a subscreen, but an item representing a set value is displayed. Thus, in the simple UI, the main setting item for which the setting is to be changed in the shooting mode can be easily specified. Furthermore, the set value can be changed by a dial operation or touch operation while grasping the relationship between a set value and its effect. Regarding the setting items other than the main setting item, a guidance is displayed together with an icon representing a setting item, and thus the user can change the settings without worries even if the user does not know the item to be selected or does not know an item which may cause the user to perform shooting by using an unfamiliar shooting method if the item is selected. Furthermore, since the number of setting items is small, the user can learn about the setting items little by little. In addition, in the setting subscreen for a setting item other than the main setting item, items are displayed in the same manner both in the simple UI and the standard UI, and thus the user can smoothly set a value after shifting to the standard UI from the simple UI.

Figure 5:
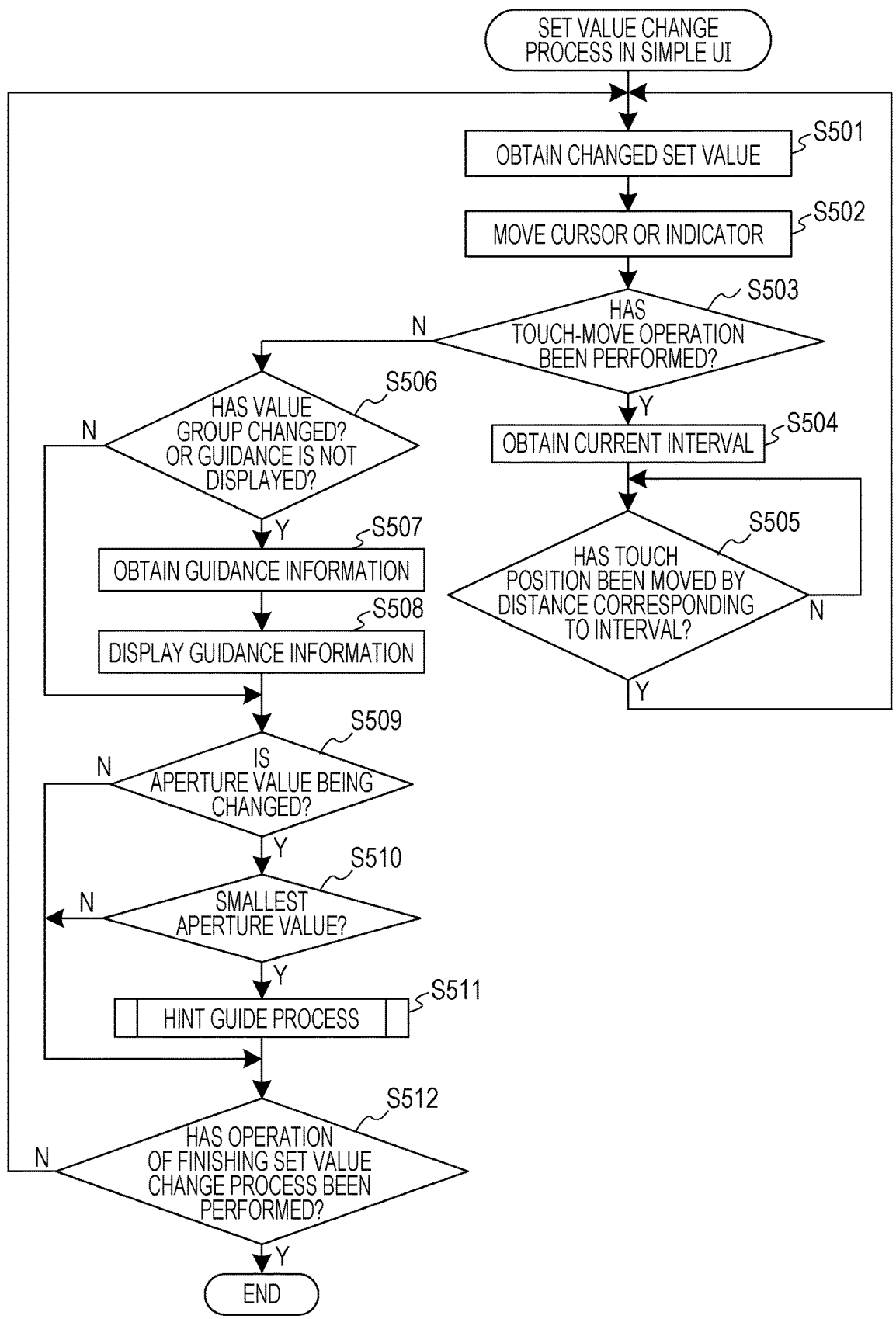
FIG. 5 is a flowchart illustrating a set value change process in a simple UI.

Next, a description will be given of a set value change process in the simple UI with reference to FIG. 5. This process is implemented by the system control unit 50 executing a program that is recorded in the nonvolatile memory 56 and loaded to the system memory 52. This process starts when the process proceeds to step S404 in FIG. 4 and when the main setting item in the simple UI becomes selectable. Alternatively, this process starts when the process proceeds to step S404 even if the main setting item does not become selectable.

In step S501, the system control unit 50 obtains a changed set value of the main setting item. If the determination result in step S403 is "YES" (YES in step S402) and if the process proceeds to step S404, or if the determination result in step S408 is "YES" after a dial operation has been performed and if the process proceeds to step S404, the changed set value can be obtained in accordance with the operation direction and the operation amount of the dial operation that has been performed. If the determination result in step S408 is "YES" after a touch operation (position designation operation) has been performed and if the process proceeds to step S404, the changed set value can be obtained in accordance with the position where the touch operation has been performed (touch-down position). If the set value is changed by a dial operation (cursor position designation operation) corresponding to one click, the set value at a settable position next to a settable position corresponding to the previous set value is obtained as the changed set value. If the dial is rotated to the right, the set value at a settable position next to the previous set value in the right direction is obtained. If the dial is rotated to the left, the set value at a settable position next to the previous set value in the left direction is obtained. For example, in a state where the shutter speed is set at $1/200$ as in FIG. 9A, if the dial is rotated to the left by one settable position, the shutter speed is set to $1/160$, whereas if the dial is rotated to the right by one settable position, the shutter speed is set to $1/250$. If the set value is changed by a touch operation, the set value at the touch-down position on the bar 917 is obtained. If touch-down is performed and then touch-move is performed, the set value at the touch position on the bar 917 after the touch-move (the set value corresponding to the touch position obtained from touch coordinates on the display unit) is obtained.

In step S502, the system control unit 50 moves the cursor or indicator to the position of the set value obtained in step S501. If the set value is changed by a dial operation, an item 902b is displayed to sandwich the set value ($1/200$) in FIG. 9A so as to indicate that the set value can be changed by a dial operation. The items 925, 926, 1006, and 1007 in FIGS. 9B and 10B may be displayed at this timing. The item 902b and the items 925 and 926 in FIGS. 9A and 9B may be kept displayed, or may be displayed upon an operation of changing the set value being performed and may be hidden after a predetermined period of time (for example, 4 or 3 seconds) elapses from when an operation of changing the set value is performed. Also in the Av mode or the M mode other than the Tv mode, the cursor or indicator is moved similarly. If the determination result in step S406 in FIG. 4 is "YES" (YES in step S408) and if the process proceeds to step S502, the cursor 918 is moved. If the determination result in step S402 in FIG. 4 is "YES" (YES in step S403) and if the process proceeds to step S502, the indicator 902a is moved.

In step S503, the system control unit 50 determines whether or not a touch-move operation on the bar has been performed. If the system control unit 50 determines that a touch-move operation has been performed, the process proceeds to step S504. Otherwise, the process proceeds to step S506.

Figure 13A:
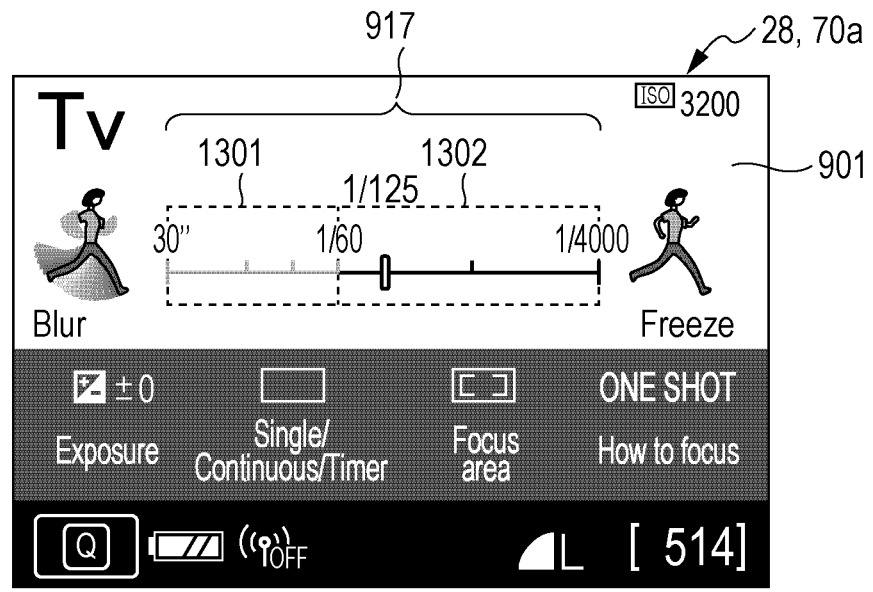
FIGS. 13A to 13D are diagrams for describing intervals between settable positions on a bar.
Figure 13B:
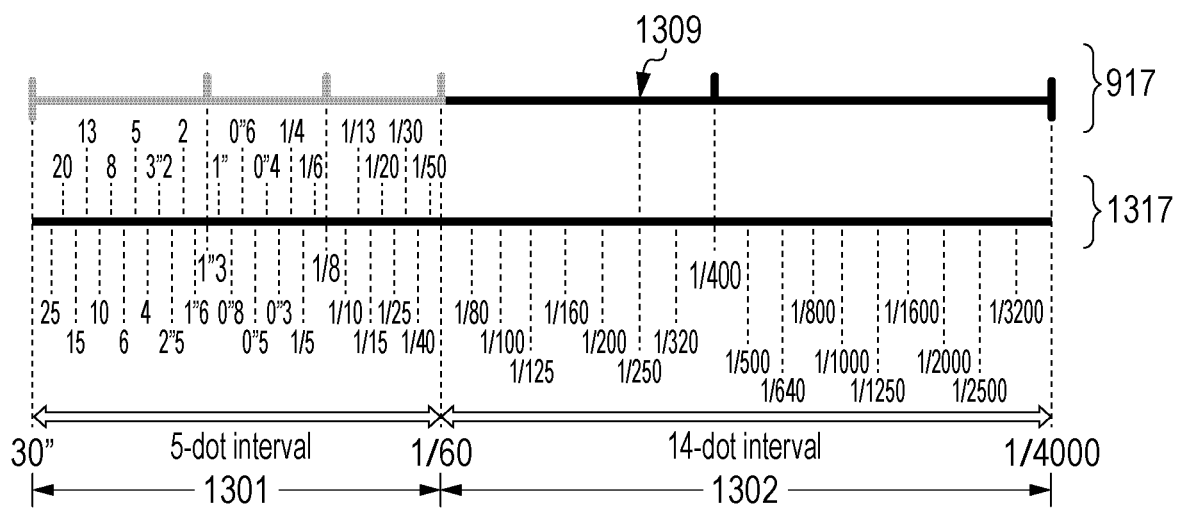
Figure 13C:
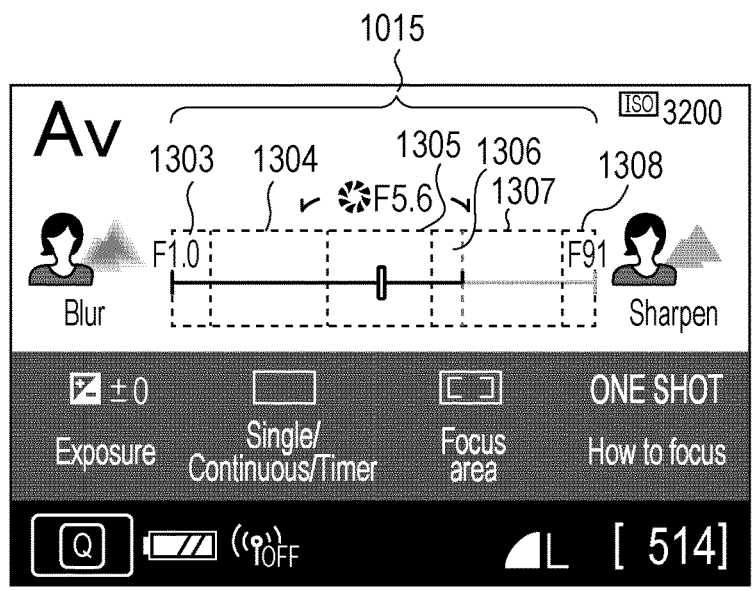
Figure 13D:
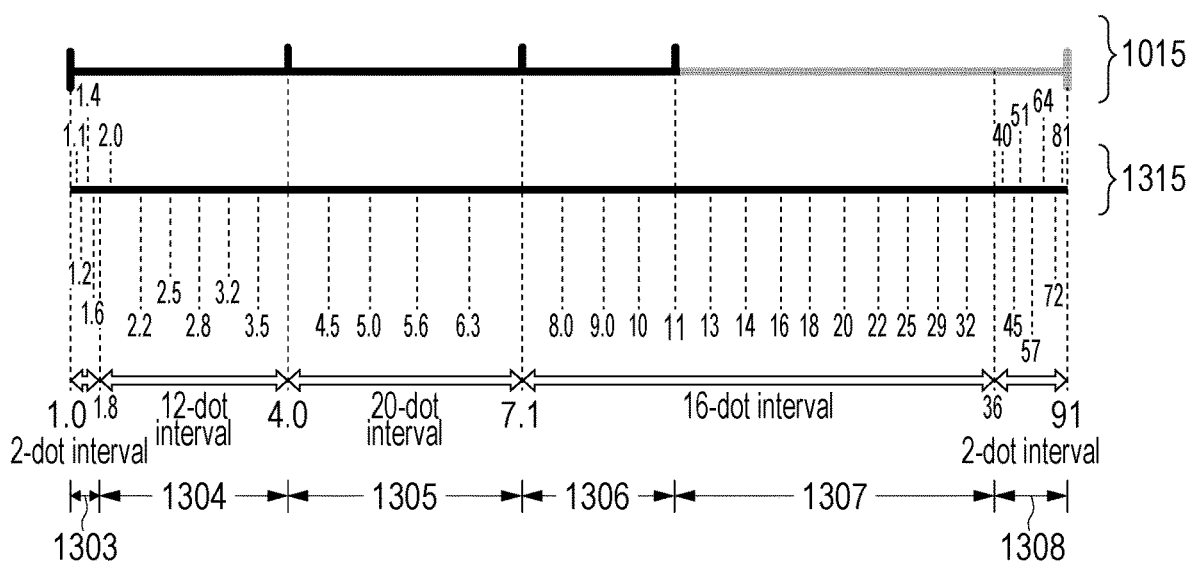

In step S504, the system control unit 50 obtains a current interval between settable positions. The intervals between settable positions will be described with reference to FIGS. 13A to 13D. FIGS. 13A to 13D are diagrams for describing the intervals between settable positions on the bars for setting a shutter speed and an aperture value. FIGS. 13A and 13B illustrate a bar for setting a shutter speed and FIGS. 13C and 13D illustrate a bar for setting an aperture value. Within each of sections 1301 to 1308, the interval between settable positions is constant. In FIG. 13A, the section 1301 corresponds to a range of 30 seconds≥(shutter speed)≥1/60 seconds (unrecommended range), and the section 1302 corresponds to a range of 1/60 seconds>(shutter speed)≥1/40000 seconds (recommended range). In FIG. 13C, the section 1303 corresponds to a range of F1.0≤(aperture value) F1.8 (recommended range), the section 1304 corresponds to a range of F1.8<(aperture value)≤F4.0 (recommended range), and the section 1305 corresponds to a range of F4.0<(aperture value)≤F7.1 (recommended range). The section 1306 corresponds to a range of F7.1<(aperture value)≤F11 (recommended range), the section 1307 corresponds to a range of F11<(aperture value)≤F36 (unrecommended range), and the section 1308 corresponds to a range of F36<(aperture value) ≤F91 (unrecommended range). In the sections 1302 to 1306, the bar is displayed in black. In the sections 1301, 1307, and 1308, the bar is displayed in gray (the color distinguishable from black). That is, the color of the bar is black in the recommended ranges whereas the color of the bar is gray in the unrecommended ranges. Accordingly, the user can understand that there are two types of ranges of values and that the values in the range corresponding to the black bar are recommended although the values in the range corresponding to the gray bar can also be set.

FIG. 13B is a diagram for describing the details of the bar 917 in the Tv mode, and FIG. 13D is a diagram for describing the details of the bar 1015 in the Av mode. Under the bar 917 in FIG. 13B, there is a bar 1317 for describing settable positions in the Tv mode. Under the bar 1015 in FIG. 13D, there is a bar 1315 for describing settable positions in the Av mode. The dotted lines on both sides of the bars 1315 and 1317 indicate the setting positions on the bars corresponding to individual values. For example, a position 1309 on the bar 917 corresponding to the position of the dotted line indicating 1/250 seconds on the bar 1317 is the setting position of a value of 1/250 seconds. If the cursor is moved to the position 1309, the shutter speed is set to 1/250 seconds.

FIGS. 13B and 13D also illustrate the relationship between the interval between settable positions and values in each section (sections 1301 to 1308) illustrated in FIGS. 13A and 13C. In FIGS. 13A and 13B, the interval between settable positions is 5 dots in the section 1301, which is smaller than the interval between settable positions in the section 1302 (14 dots). That is, the interval between settable positions on the bar corresponding to the values in an unrecommended range is small whereas the interval between settable positions on the bar corresponding to the values in a recommended range is large, so that the values in the recommended range can be more easily set by a touch operation. In the section 1301, settable positions corresponding to values that can be set as a shutter speed, 30 seconds, 25 seconds, 20 seconds, 15 seconds, 13 seconds, 10 seconds, 8 seconds, 6 seconds, 5 seconds, 4 seconds, 3.2 seconds, 2.5 seconds, 2 seconds, 1.6 seconds, 1.3 seconds, . . . , and 1/60 seconds, are located at an interval of 5 dots. In the section 1302, settable positions corresponding to values that can be set as a shutter speed, 1/80 seconds, 1/100 seconds, 1/125 seconds, 1/160 seconds, 1/200 seconds, 1/250 seconds, . . . , 1/3200 seconds, and 1/4000 seconds, are located at an interval of 14 dots.

In FIGS. 13C and 13D, the interval between settable positions becomes smaller in the order of the section 1305 (20 dots), the sections 1306 and 1307 (16 dots), the section 1304 (12 dots), and the sections 1303 and 1308 (2 dots). In the section 1305, which is a recommended range, the interval between settable positions is larger than in the sections 1307 and 1308, which are unrecommended ranges. However, in the section 1304, which is a recommended range, the interval between settable positions is smaller than in the section 1307, which is an unrecommended range. This is because, although the section 1304 is a recommended range, a lens such as a kit lens (a lens suitable for a beginner) that is used by a user of the simple UI does not compatible with the values in the section 1304 in many cases. If the interval between settable positions in the section 1304 is increased as in the section 1305, the interval between settable positions in another section that is frequently used needs to be decreased because there is a limit in the length of the bar 1015, and the operability may decrease. The interval between settable positions is 2 dots in the sections 1303 and 1308 because the values included in these sections are used in lenses mostly used by advanced users (professionals or high amateurs), although the section 1303 is a recommended range. Among the sections corresponding to the recommended ranges, the section 1305 is the range that is particularly recommended to a beginner (the range of values that are unlikely to cause failures) and thus the interval therein is larger than in the section 1306. In the section 1303, settable positions corresponding to values that can be set as an aperture value, F1.0, F1.1, F1.2, F1.4, F1.6, and F1.8, are located at an interval of 2 dots. In the section 1304, settable positions corresponding to values that can be set as an aperture value, F2.2, F2.5, F2.8, F3.2, and F3.5, are located at an interval of 12 dots. In the section 1305, settable positions corresponding to values that can be set as an aperture value, F4.5, F5.0, F5.6, F6.3, and F7.1, are located at an interval of 20 dots. In the section 1306, settable positions corresponding to values that can be set as an aperture value, F8.0, F9.0, F10, and F11, are located at an interval of 16 dots. In the section 1307, settable positions corresponding to values that can be set as an aperture value, F13, F14, F16, F18, F20, F22, and F25, are located at an interval of 16 dots. In the section 1308, settable positions corresponding to values that can be set as an aperture value, F36, F40, F45, F51, F57, and F64, are located at an interval of 2 dots. In this way, according to the exemplary embodiment, the interval between settable positions on the bar of values that can be set varies according to a section.

In the sections 1304 (also 1303), 1305, and 1306 among the sections 1303 to 1306 corresponding to recommended ranges, the guidance described below regarding step S508 in FIG. 5 varies as well as the interval between settable positions. In the case of aperture value or shutter speed, settable values may be provided in one step increments. Also in this case, the interval between values provided in one step increments varies according to the range of values.

With the interval between settable positions in a recommended range being increased, the width of the recommended range increases whereas the width of an unrecommended range decreases even if the length of the bar that can be displayed is limited and the bar has a predetermined length. By displaying a recommended range and an unrecommended range such that the width of the recommended range is larger than that of the unrecommended range, the possibility is implied that shooting may fail if a value in the unrecommended range is selected in a two-alternative manner similarly to a setting value in the recommended range. Accordingly, the user is less likely to unintendedly select a value in the unrecommended range (a value that is likely to cause failure if the user unintendedly sets it). As a result of varying the interval between settable positions, the possibility decreases in which the user who does not know well the range of values that are appropriate or that are to be used carefully in shooting unintendedly selects a value in the unrecommended range, resulting in failure in shooting. In the bar for setting a shutter speed, if the interval between settable positions is the same in the recommended range and the unrecommended range, the section corresponding to the recommended range is shorter than the section corresponding to the unrecommended range. The width of the section corresponding to the recommended range can be increased by varying the interval between settable positions. Furthermore, by decreasing the interval between settable positions in the range of values that are not settable in a lens used mainly by a beginner, the width of the range of values that are frequently used can be increased, so that the operability in a touch operation is increased. As for the bar indicating ISO speed, the interval between settable positions is constant.

In the case of selecting a value by moving a cursor in touch-move, fine adjustment can be performed more easily as the interval between settable positions increases. That is, in a case where the length of a bar is limited, the interval between settable positions in a less frequently used range is decreased and the interval between settable positions in a more frequently used range is increased. Accordingly, when the user wants to move an indicator by a minimum unit (for example, from F5.6 to F6.3) by using touch-move in a frequently used range (and a recommended range), the user only needs to move his/her finger by 20 dots or more and less than 40 dots. In contrast, in an unrecommended range, the value is changed by a minimum unit (for example, from F20 to F22) by moving the finger by 16 dots or more and less than 32 dots. That is, in a frequently used range, the indicator can be moved by one unit by a rougher operation and accordingly the operability increases. In step S504, the interval between settable positions illustrated in FIG. 13B or 13D is obtained on the basis of the originally set value and the settable position in the direction of touch-move performed in step S503. That is, if touch-move in the right direction is performed when the set value is F7.1 in FIG. 13D, an interval of 16 dots is obtained in step S504. If touch-move in the left direction is performed, an interval of 20 dots is obtained in step S504. Subsequently, in step S505, it is determined whether or not touch-move over a distance corresponding to 16 dots or 20 dots has been performed.

In the subscreen of the standard UI in the Av mode (setting screen 1234) illustrated in FIG. 12E, described above regarding step S410 in FIG. 4, the interval between settable positions is constant in the bar 1235. In contrast, in the shooting screen of the simple UI, the interval between settable positions in a recommended range is large. The display format on the bar varies between the standard UI and the simple UI. In the bar 1235 of the standard UI, the display format is the same in all the ranges of values. In contrast, in the bar of the simple UI (the bar 1015 in the item 1002 in FIG. 10A), the display format varies according to a range of values. In the bar 1235, the interval between settable positions is larger than or equal to an interval a in the simple UI, only some of values that can be set are displayed on the display unit 28, and a range to be displayed can be changed by performing a scrolling operation. In the simple UI, a bar is displayed such that the entire settable range can be viewed at a time (displayed on one screen). In the simple UI, the user can view all values, so that the user can determine a value to be set while reading guidance. In contrast, in the standard UI, the user performs a setting operation after clearly deciding on a value to be set, and thus the interval between settable positions (the interval between tick marks) is increased so that individual values can be clearly seen. Furthermore, when the bar 1235 of the standard UI is displayed, the items representing the other setting items are not displayed on the display unit 28, but the bar of the simple UI in FIG. 10A (the bar in the item 1002) is displayed together with the items 903 to 906. The color of the bar in the section corresponding to an unrecommended range is not limited to gray. The bar in the section corresponding to an unrecommended range may be displayed in any manner as long as it is less eye-catching than the bar in the section corresponding to a recommended range. For example, the bar in the section corresponding to a recommended range may be represented by a solid line whereas the bar in section corresponding to an unrecommended range may be represented by a dotted line or a thinner line.

In step S505, the system control unit 50 determines whether or not the touch position has been moved by a distance corresponding to the interval between settable positions obtained in step S504. Alternatively, the system control unit 50 determines whether or not a position corresponding to the next value (a position on the bar that is distant by a distance corresponding to the interval between settable positions) has been touched. If the system control unit 50 determines that the touch position has been moved by a distance corresponding to the interval between settable positions, the process returns to step S501. Otherwise, the system control unit 50 waits until the touch position is moved by a distance corresponding to the interval (until the position corresponding to the next value is touched). If touch-up is performed without touch-move over a distance corresponding to the interval being performed, the process proceeds to step S506. If the set value is changed through touch-move, the process returns from step S505 to step S501, the changed set value is obtained, the cursor is moved, and then the process proceeds to step S502 and to step S506, so as to perform a process related to display of guidance in step S506 and thereafter.

In step S506, the system control unit 50 determines whether or not the value group to which the changed set value obtained in step S501 belongs has changed. The determination in step S506 is a determination of whether or not the cursor or indicator moved in step S502 beyond a boundary line on the bar (for example, a boundary line 922 in FIG. 9B). Here, the value group is a group of a plurality of values in a range between boundary lines on the bar. The values between two boundary lines belong to the same value group. The same guidance is displayed for the values belonging to the same value group, and different guidances are displayed for the values belonging to different value groups. If a guidance is not displayed for a set value, the determination result in step S506 is "YES". If the system control unit 50 determines that the value group has changed, the process proceeds to step S507. Otherwise, the process proceeds to step S509.

In step S507, the system control unit 50 obtains guidance information about the value group including the currently set value.

In step S508, the system control unit 50 displays a guidance on the display unit 28 on the basis of the guidance information obtained in step S507. In this way, the guidance is changed every time a shooting effect or instructions change. Thus, even if the user does not know well the relationship between a set value and a shooting effect or instructions, the user can grasp and learn them before shooting. Hereinafter, the guidance in the Tv mode will be described with reference to FIGS. 9B to 9F.

Figure 9C:
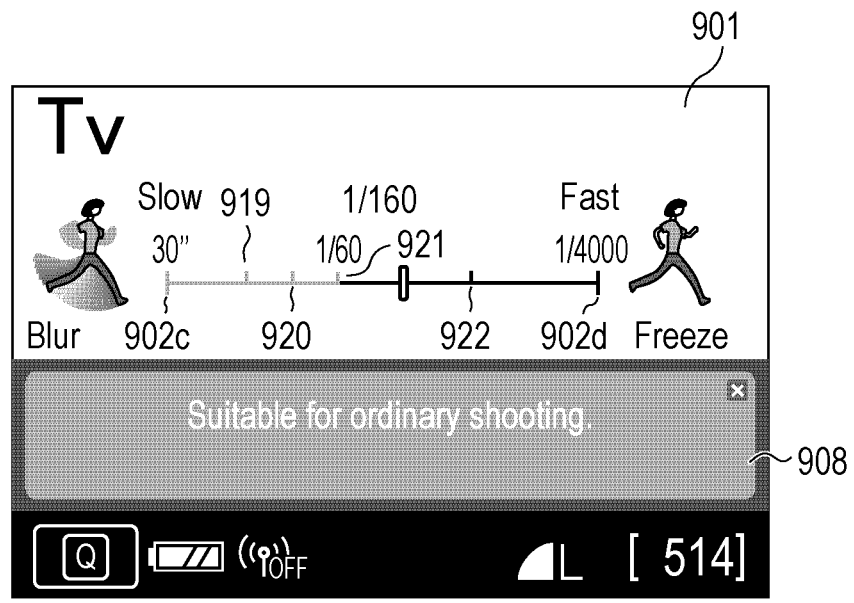
Figure 9D:
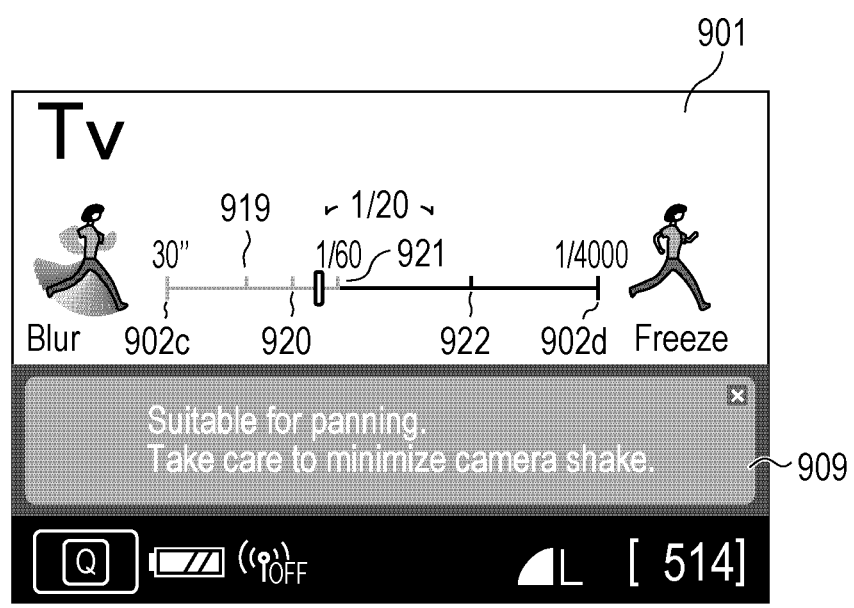
Figure 9E:
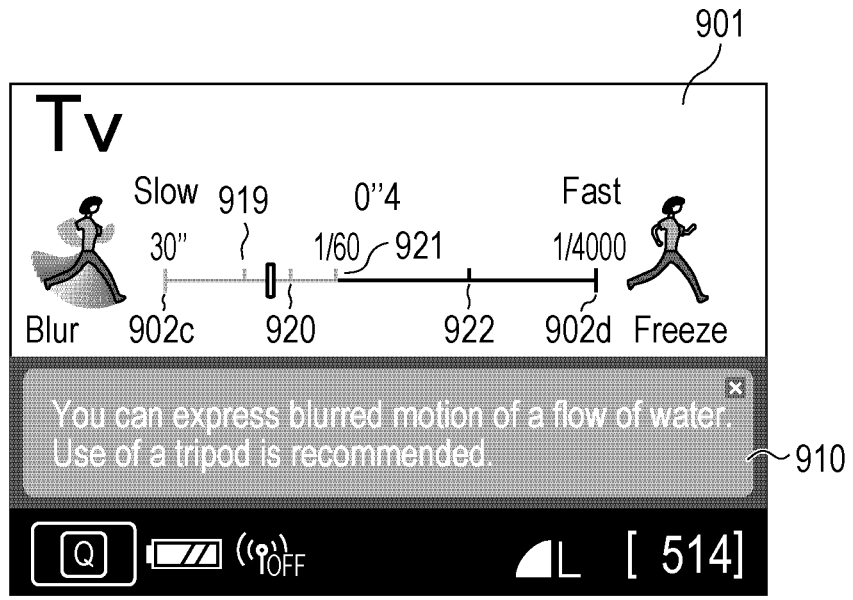
Figure 9F:
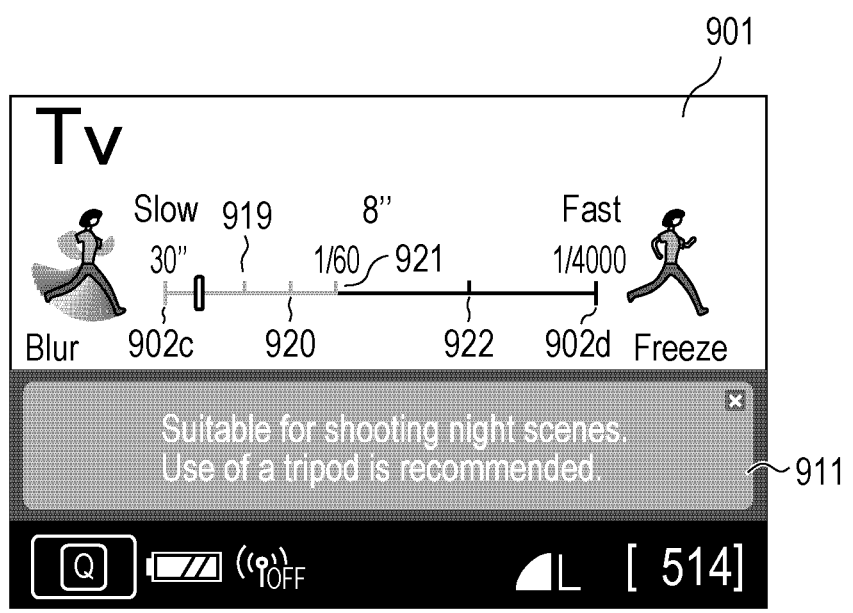
Figure 9G:
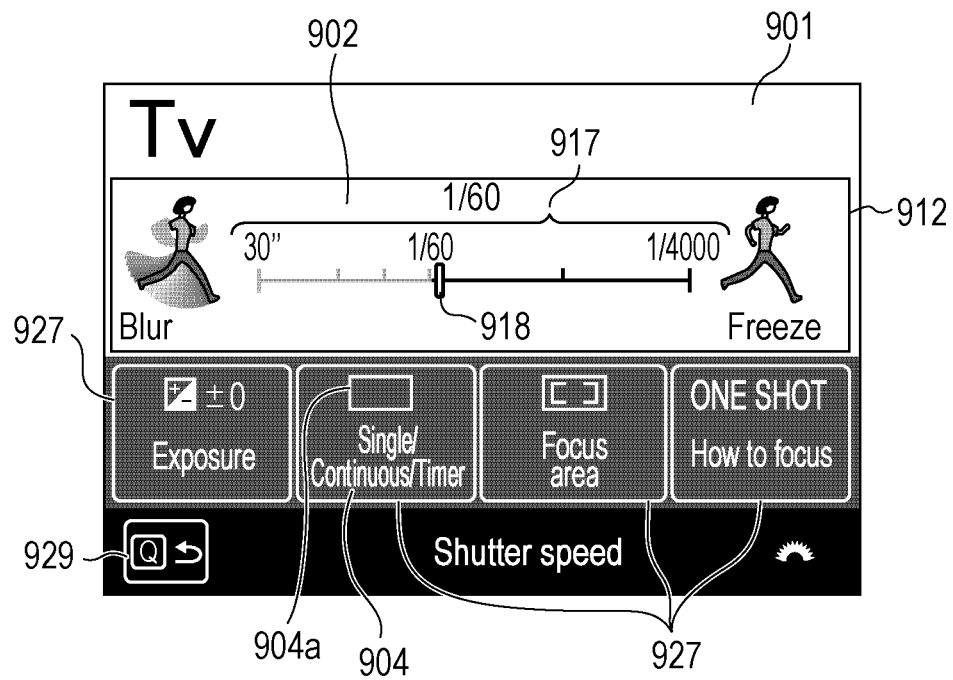
Figure 9H:
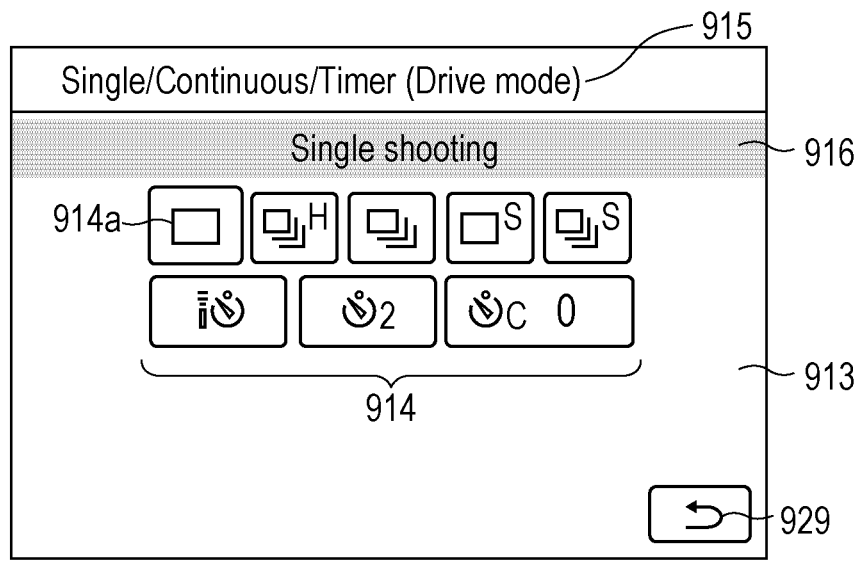

FIGS. 9B to 9F illustrate display examples of a guidance about a shutter speed in the shooting screen. FIG. 9B illustrates a setting screen in which the set value is within a range of 1/400 seconds>(shutter speed) 1/4000 seconds (from the boundary line 922 to the end of bar 902d), and FIG. 9C illustrates a setting screen in which the set value is within a range of 1/60 seconds>(shutter speed)≥1/400 seconds (from a boundary line 921 to the boundary line 922). FIG. 9D illustrates a setting screen in which the set value is within a range of 1/8 seconds>(shutter speed)≥1/60 seconds (from a boundary line 920 to the boundary line 921), and FIG. 9E illustrates a setting screen in which the set value is within a range of 1.3 seconds>(shutter speed)≥1/8 seconds (from a boundary line 919 to the boundary line 920). FIG. 9F illustrates a setting screen in which the set value is within a range of 30 seconds≥(shutter speed)≥1.3 seconds (from the end of bar 902c to the boundary line 919). A guidance 907 in FIG. 9B indicates that the user can take a picture of frozen motion of a person, a vehicle, etc. (i.e., subject blur is reduced). A guidance 908 in FIG. 9C indicates that the set shutter speed is suitable for ordinary shooting. A guidance 909 in FIG. 9D indicates that the set shutter speed is suitable for panning or the like and that the user needs to take care to minimize camera shake (warning). A guidance 910 in FIG. 9E indicates that the user can express blurred motion of a flow of water (i.e., a great blurred effect can be obtained), and that use of a tripod is recommended. A guidance 911 in FIG. 9F indicates that the set shutter speed is suitable for shooting night scenes or the like (i.e., suitable for shooting a dark subject with a small amount of light) and that use of a tripod is recommended. In this way, a suitable shooting scene, an effect obtained by shooting, and instructions about shooting are displayed in accordance with the range including a set shutter speed.

Next, a description will be given of a guidance about an aperture value with reference to FIGS. 10A to 10F. FIGS. 10B to 10E illustrate display examples of a guidance about an aperture value in the shooting screen. FIG. 10B illustrates a setting screen in which the set value is within a range of F1.0≤(aperture value)≤F4.0 (from the end of bar 1002c to a boundary line 1003), and FIG. 10C illustrates a setting screen in which the set value is within a range of F4.0<(aperture value)≤F7.1 (from the boundary line 1003 to a boundary line 1004). FIG. 10D illustrates a setting screen in which the set value is within a range of F7.1<(aperture value)≤F11 (from the boundary line 1004 to a boundary line 1005), and FIG. 10E illustrates a setting screen in which the set value is within a range of F11<(aperture value)≤F91 (from the boundary line 1005 to the end of bar 1002d). A guidance 1009 in FIG. 10B indicates that the background will be blurred (i.e., the depth of field is shallow). A guidance 1010 in FIG. 10C indicates that the set aperture value is suitable for ordinary shooting. A guidance 1011 in FIG. 10D indicates that the background will be sharp (i.e., the depth of field is deep) and that the user needs to take care to minimize camera shake. A guidance 1012 in FIG. 10E indicates that the background will be sharper (i.e., the depth of field is deeper) and that the user needs to take care to minimize camera shake or use a tripod. In this way, in the shooting screen in the Av mode, as in the shooting screen in the Tv mode, an effect to be obtained by shooting and instructions about shooting are displayed in accordance with the range including a set aperture value. The user can know that, in the Tv mode, the degree of blur in a captured image (the degree of blur caused by a motion of a subject) is changed, it is necessary to take care to minimize camera shake, and shooting of a night scene or a frozen motion can be appropriately performed, depending on a set value of a shutter speed. Also, the user can know that, in the Av mode, the degree of blur of a background of a captured image (depth of field) is changed, it is necessary to take care to minimize camera shake, and a tripod is necessary, depending on a set value of an aperture value. In this way, with the simple UI, the user can learn the relationship between shooting modes and effects obtained therein, and thereby can expand the variation of subjects and the range of expression. The range of settable aperture values varies according to a mounted lens (i.e., the range of settable values varies according to an external apparatus connected to the camera). The minimum aperture value is F1.0 whereas the maximum aperture value is F91. The range of values that are not settable in the mounted lens is grayed out (with a color lighter than the color of an unrecommended range). The aperture values F11 to F91 are in an unrecommended range because these values are likely to cause blurring due to camera shake and are difficult to use for the user of the simple UI.

Merely displaying the character strings "blur" and "freeze" for shutter speed or the character strings "blur" and "sharpen" for aperture value at the positions corresponding to the minimum and maximum values allows the user to understand that the individual effects increase as the set value approaches the minimum or maximum. However, if the values are roughly grouped into several shooting groups, the user can grasp the range of values suitable for ordinary shooting, and can also grasp in detail how sharp the background will be and which care is required to be taken at the shooting when using each aperture value. For example, it is assumed that the user wants to obtain a sharp background. In this case, if only "blur" and "sharpen" are displayed on the setting screen, the user who uses the simple UI may set the largest aperture value to maximize the effect of sharpness. Actually, however, the largest aperture value is likely to cause a failure in shooting due to cameral shake, and a sharp background is not necessarily obtained. Furthermore, the user may eventually give up shooting because of not finding the cause of the failure. In contrast, if the range of values which will produce a sharp background and in which taking care is necessary to minimize camera shake is presented to the user, the user can perform shooting while taking care to minimize camera shake. Even if the shooting fails, the user can perform shooting again while taking care because he/she knows the cause of the failure. Furthermore, since the guidance changes every time the set value changes beyond a boundary line, the user can set a value while recognizing that the effect and instructions change if a set value changes beyond a boundary line. If the user does not want to change the effect that is currently shown, the user may move the cursor within the same range. If the user wants another effect (instructions), the user may move the cursor beyond a boundary line. In this way, the user can be assisted to set an appropriate value.

In step S509, the system control unit 50 determines whether or not the setting item for which the set value is currently changed is aperture value. If the system control unit 50 determines that the setting item for which the set value is currently changed is aperture value, the process proceeds to step S510. Otherwise, the process proceeds to step S512.

In step S510, the system control unit 50 determines whether or not the value that is currently set is the smallest aperture value. The smallest aperture value is the smallest settable value although it varies according to a lens. As the aperture value becomes closer to the smallest aperture value, the degree of blur increases in the foreground and background of an image that is taken. For example, in FIG. 10A, it is determined whether or not the aperture value has been set to F1.8. In FIG. 10F, it is determined whether or not the aperture value has been set to F3.5. If the system control unit 50 determines that the value that is currently set is the smallest aperture value, the process proceeds to step S511. Otherwise, the process proceeds to step S512.

In step S511, the system control unit 50 performs a process of displaying a hint guide (hint guide process). The hint guide process will be described below with reference to FIG. 6.

In step S512, the system control unit 50 determines whether or not an operation of finishing the set value change process in the simple UI has been performed. The operation of finishing the set value change process in the simple UI is power-OFF or touching of the Q back button 929. If the Q back button 929 is touched, the state illustrated in FIG. 9G changes to the state illustrated in FIG. 9A, that is, the display format in which frames are placed on the individual items (902 to 906) changes to the display format in which no frames are placed thereon.

In the exemplary embodiment described above with reference to FIG. 5, the interval between settable positions is different between a recommended range and an unrecommended range, so that the recommended range is relatively wide and the unrecommended range is relatively narrow on a bar. Accordingly, a user's unintended selection of the unrecommended range is suppressed. In the recommended range, a value can be easily set by touch-move. Since the guidance varies in each value group, the user can learn an effect of shooting and instructions about shooting for each value group.

Figure 6:
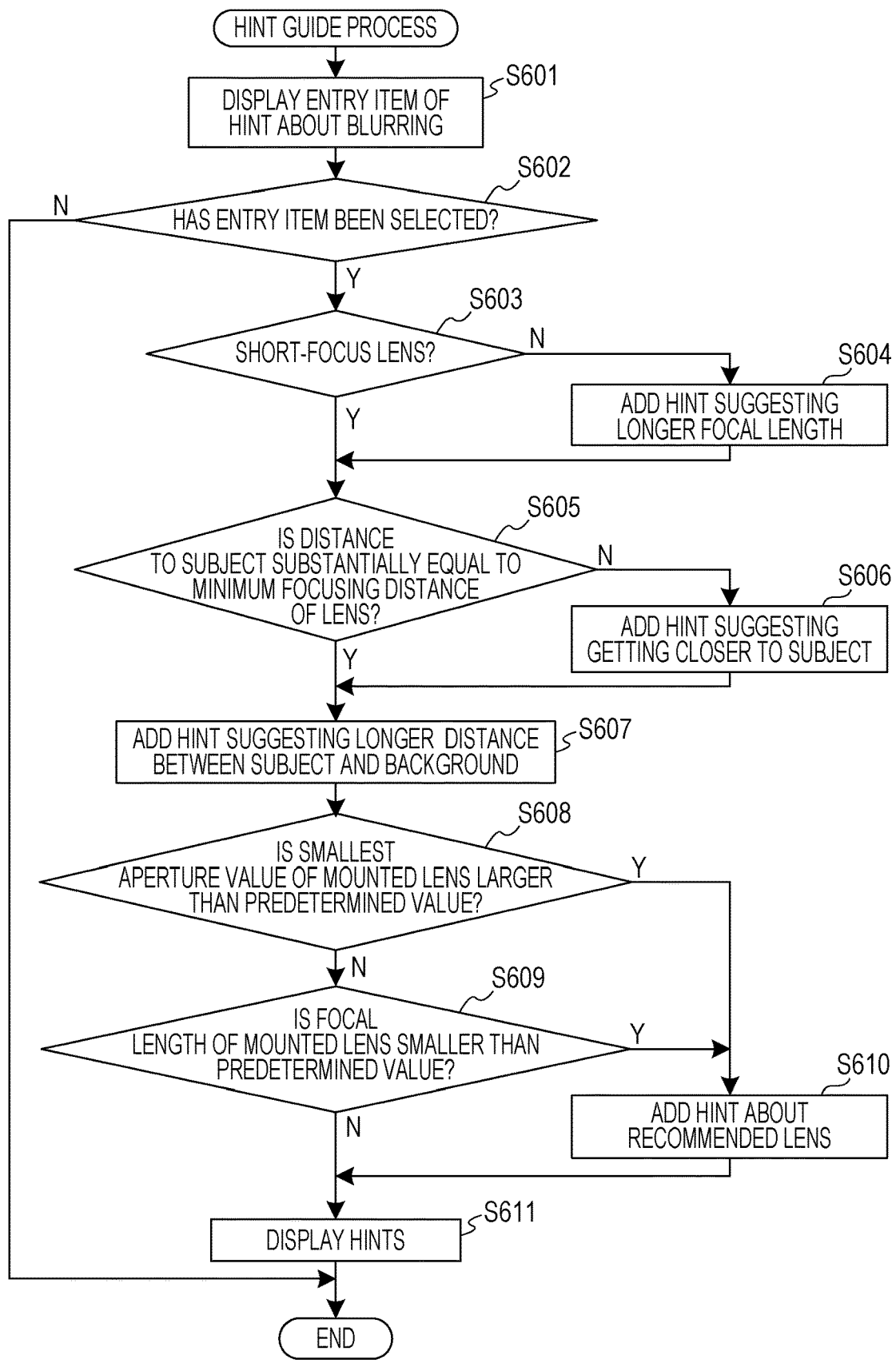
FIG. 6 is a flowchart illustrating a hint guide process.

Next, a description will be given of the hint guide process with reference to FIG. 6. This process is implemented by the system control unit 50 executing a program that is recorded in the nonvolatile memory 56 and loaded to the system memory 52. This process starts when the process proceeds to step S511 in FIG. 5, and if the setting item is aperture value and if it is determined that the set value is the smallest aperture value.

Figure 14A:
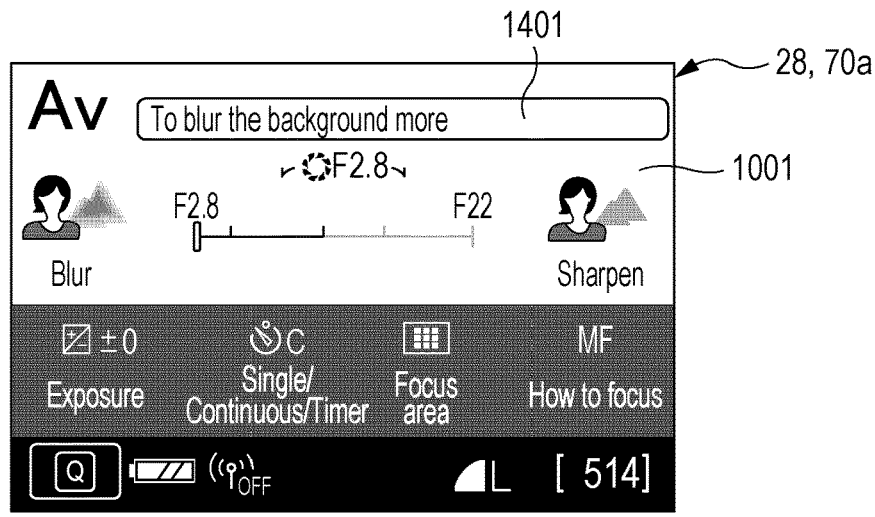
FIGS. 14A to 14C illustrate display examples of hints about blurring.

In step S601, the system control unit 50 displays an entry item of a hint about blurring. An entry item 1401 illustrated in FIG. 14A is an entry item of a hint about blurring, and is an item indicating that there is a hint for a user who has set the smallest aperture value and who wants to blur the background more. Upon the entry item 1401 being selected, a hint for blurring the background by using a method different from the setting of an aperture value is displayed.

In step S602, the system control unit 50 determines whether or not the entry item 1401 in FIG. 14A has been selected. If the system control unit 50 determines that the entry item 1401 has been selected, the process proceeds to step S603. Otherwise, the process ends.

In step S603, the system control unit 50 determines whether or not the lens that is mounted is a short-focus lens. If the system control unit 50 determines that the lens that is mounted is a short-focus lens, the process proceeds to step S605. Otherwise, the process proceeds to step S604.

Figure 14B:
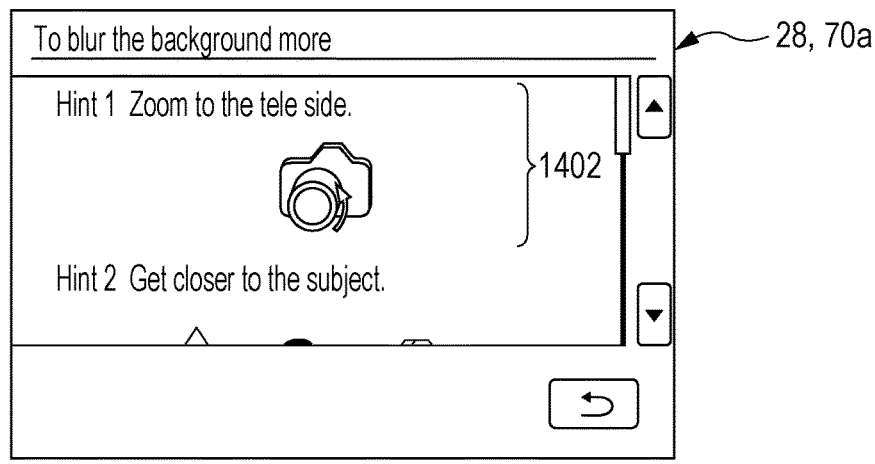

In step S604, the system control unit 50 adds a hint suggesting a longer focal length as one of hints that are displayed after the entry item 1401 is selected. FIG. 14B illustrates a display example of hints. The foregoing hint suggesting a longer focal length is displayed as a hint 1402 "zoom to the tele side". There are hints 1 to 4 at the maximum, and the number of hints varies according to the determination results in steps S603, S605, S608, and S609.

In step S605, the system control unit 50 determines whether or not the distance to the subject is substantially equal to the minimum focusing distance of the lens. If the system control unit 50 determines that the distance to the subject is substantially equal to the minimum focusing distance of the lens, the process proceeds to step S607. Otherwise, the process proceeds to step S606. Alternatively, the process may proceed to step S606 without step S605 being performed, and the hint added in step S606 may be displayed.

In step S606, the system control unit 50 adds a hint suggesting getting closer to the subject as one of hints that are displayed after the entry item 1401 is selected. The foregoing hint suggesting getting closer to the subject is displayed as a hint 1403 "get closer to the subject".

In step S607, the system control unit 50 adds a hint suggesting a longer distance between the subject and the background as one of hints that are displayed after the entry item 1401 is selected. The foregoing hint suggesting a longer distance between the subject and the background is displayed as a hint 1404 "increase the distance between the subject and background".

In step S608, the system control unit 50 determines whether or not the smallest aperture value of the mounted lens is larger than a predetermined value. The predetermined value is, for example, F2.8 or F4.0. If the system control unit 50 determines that the smallest aperture value of the mounted lens is larger than the predetermined value, the process proceeds to step S610. Otherwise, the process proceeds to step S609.

In step S609, the system control unit 50 determines whether or not the focal length of the mounted lens is smaller than a predetermined value. If the system control unit 50 determines that the focal length of the mounted lens is smaller than the predetermined value, the process proceeds to step S610. Otherwise, the process proceeds to step S611.

In step S610, the system control unit 50 adds a hint about a recommended lens as one of hints that are displayed after the entry item 1401 is selected. The foregoing hint about a recommended lens is displayed as a hint 1405 "the background will be blurred more by using a lens having a smaller aperture value and a longer focal length".

Figure 14C:
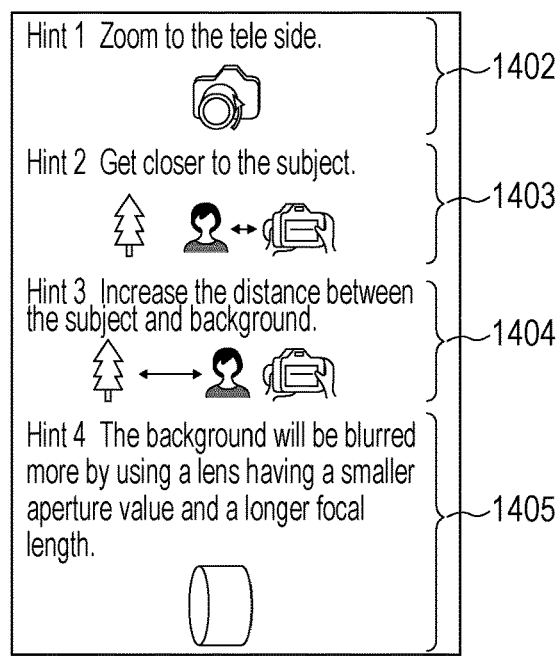

In step S611, the system control unit 50 displays the hints added to be displayed in steps S604, S606, S607, and S610 (the sentences stating the methods for obtaining blur other than the setting of an aperture value). If there are hints 1 to 4, hints 1 to 4 are listed in order as illustrated in FIG. 14C, a part of them is displayed on the display unit 28 as illustrated in FIG. 14B, and page scrolling can be performed by upward touch-move or a press of a down key. In this way, when the aperture value is set at the smallest value, hints for further increasing the degree of blur other than the setting of an aperture value are displayed. In step S611, hints about zooming, the distance to the subject, and the type of lens are displayed, not about the setting of an aperture value.

In the exemplary embodiment described with reference to FIG. 6, the user who has set the smallest aperture value can know the methods for further increasing an effect of blur. The user who has set the smallest aperture value may want to further increase the effect of blur. The function in which an entry item for displaying hints is displayed so that the hints for increasing the degree of blur can be displayed is convenient for a user, such as a user of the simple UI, who does not know what to do to further increase the degree of blur or who does not know whether there is another method for obtaining an effect of blur. If the entry item is displayed when the smallest aperture value is not set, such display is unnecessary for a user who does not want to blur the background. The timing to display the entry item is not limited to when the aperture value is set to the smallest value. For example, the entry item may be displayed if the set value is continuously changed toward the smallest side by a predetermined value or more (if the set value is changed by a predetermined amount or more). The effect to be obtained may be an impression of motion other than blur. An example of a hint for giving an impression of motion to an image is selecting a moving subject. When shutter speed, not aperture value, is selected as a setting item, an effect of suppressing blurring due to camera shake can be obtained by setting a high shutter speed. Other than setting of a shutter speed, there are methods for suppressing blurring due to camera shake, such as mounting a camera on a tripod, using a self-timer, and using a remote control. However, a beginner may be unfamiliar with these methods. If these methods are shown as hints on the setting screen for a shutter speed, the user can obtain an image in which blurring due to camera shake is suppressed.

Figure 7:
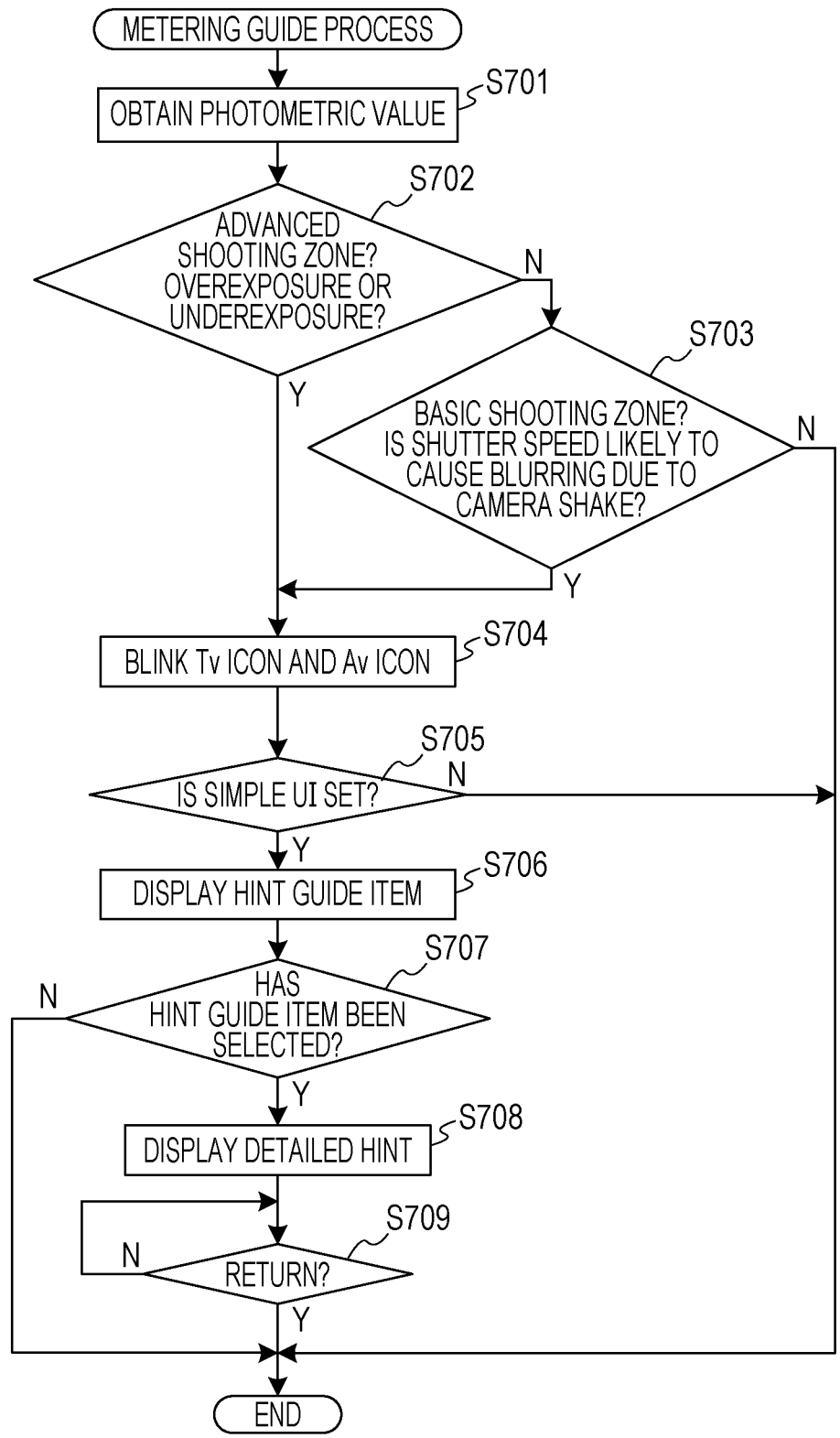
FIG. 7 is a flowchart illustrating a metering guide process.

Next, a description will be given of the metering guide process with reference to FIG. 7. This process is implemented by the system control unit 50 executing a program that is recorded in the nonvolatile memory 56 and loaded to the system memory 52. This process starts when the process proceeds to step S309 in FIG. 3 and if it is determined that a metering instruction has been provided.

In step S701, the system control unit 50 obtains a photometric value. The photometric value can be obtained from the AE sensor 17.

In step S702, the system control unit 50 determines whether or not the shooting mode is in the advanced shooting zone and whether the photometric value represents overexposure, underexposure, or neither of them. A case where a result of metering indicates that the set shutter speed and aperture value will create an image that is bright beyond a range of proper exposure is called overexposure. On the other hand, a case where a result of metering indicates that the set shutter speed and aperture value will create an image that is dark beyond a range of proper exposure is called underexposure. In the case of overexposure, a bright and whitish image will be taken. In the case of underexposure, a dark and blackish image will be taken. If the system control unit 50 determines that an image to be taken will be overexposed or underexposed, the process proceeds to step S704. Otherwise, the process proceeds to step S703.

In step S703, the system control unit 50 determines whether or not the shooting mode is in the basic shooting zone and whether or not the set shutter speed is likely to cause blurring due to camera shake. If the system control unit 50 determines that the shutter speed is likely to cause blurring due to camera shake, the process proceeds to step S704. Otherwise, the metering guide process ends.

Figure 15A:
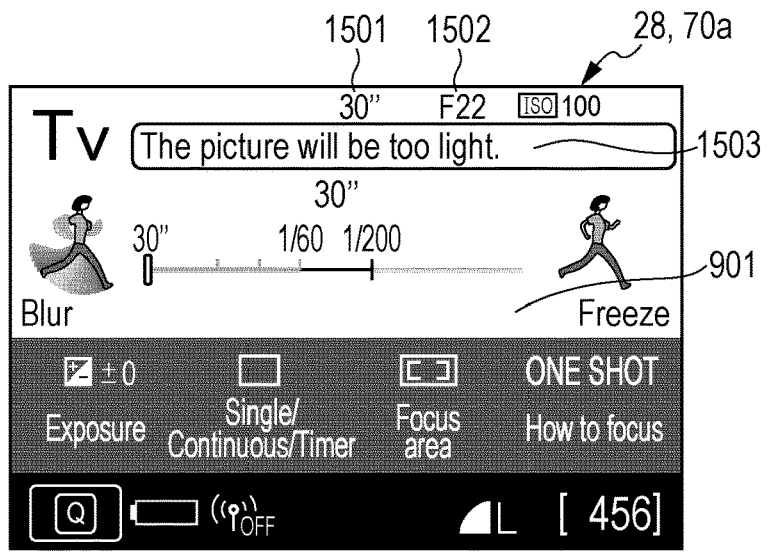
FIGS. 15A to 15E illustrate display examples of guidance about metering.
Figure 15B:
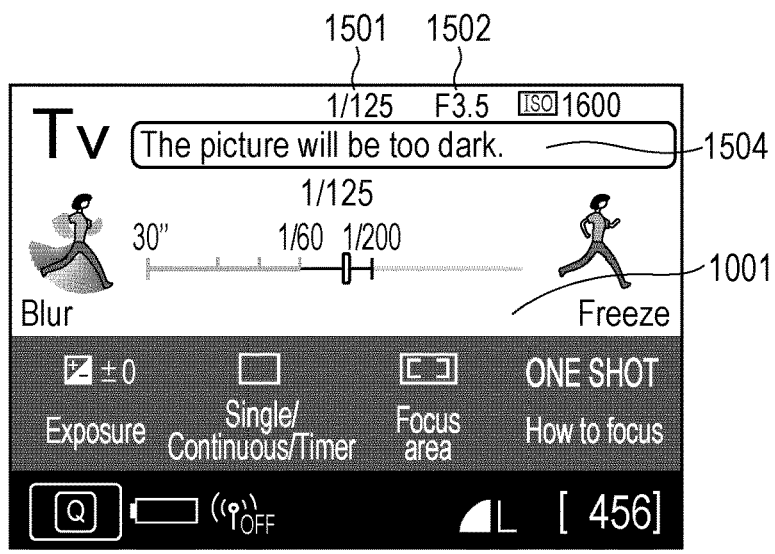
Figure 15C:
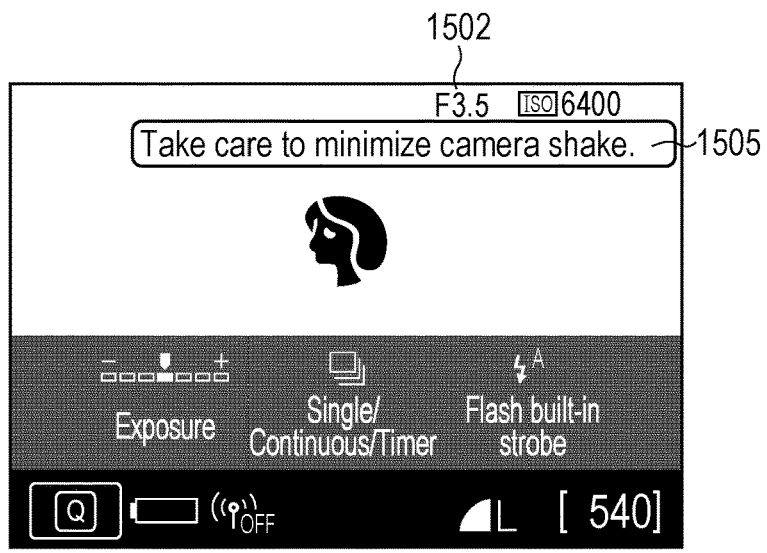

In step S704, the system control unit 50 gives a warning by blinking a Tv icon and an Av icon. FIGS. 15A and 15B illustrate a Tv icon 1501 and an Av icon 1502, which represent a shutter speed and an aperture value, respectively. FIG. 15C illustrates the Av icon 1502. In step S704, since it is determined that the image will be overexposed or underexposed or it is determined that the shutter speed is likely to cause blurring due to camera shake, the Tv icon and Av icon are blinked to draw user's attention. Here, FIGS. 15A to 15E illustrate display examples of guidance about metering.

In step S705, the system control unit 50 determines whether or not the currently set display UI is the simple UI. If the system control unit 50 determines that the simple UI is set, the process proceeds to step S706. Otherwise, the process in FIG. 7 ends. If the simple UI is set, a hint guide and a detailed hint (described below) are displayed in step S706 and thereafter. If the standard UI is set, only the blinking of the Tv icon and the Av icon serves as a guide about the photometric value.

In step S706, the system control unit 50 displays a hint guide item on the display unit 28. FIGS. 15A to 15C illustrate hint guide items 1503 to 1505. The hint guide item 1503 is displayed if it is determined in step S702 that the image to be taken will be overexposed, whereas the hint guide item 1504 is displayed if it is determined in step S702 that the image to be taken will be underexposed. The hint guide item 1505 is displayed if it is determined in step S703 that the shutter speed is likely to cause blurring due to camera shake. The hint guide items 1503 and 1504 are not necessarily displayed in the metering guide process. For example, when a shutter speed is set (in the Tv mode or the M mode), it may be determined, by using the immediately preceding metering result, whether or not the image to be taken will be overexposed or underexposed, and a hint guide item may be displayed to give a warning.

In step S707, the system control unit 50 determines whether or not the hint guide item displayed in step S706 has been selected. If the system control unit 50 determines that the hint guide item has been selected, the process proceeds to step S708. Otherwise, the process in FIG. 7 ends.

Figure 15D:
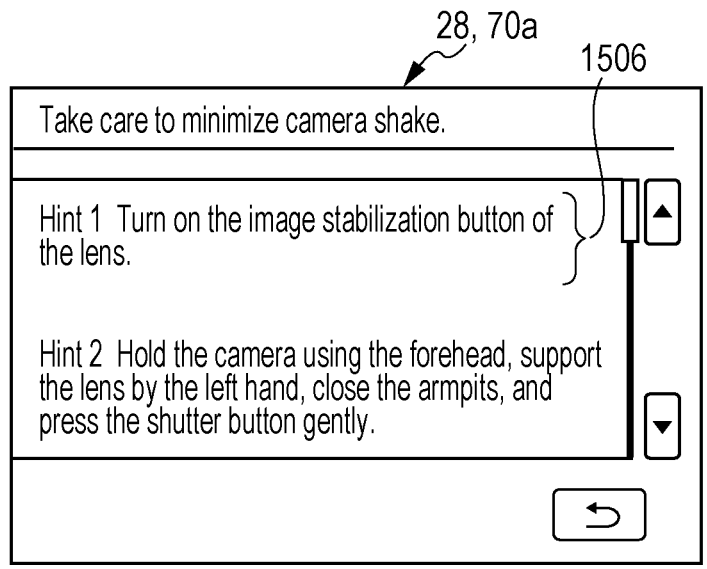
Figure 15E:
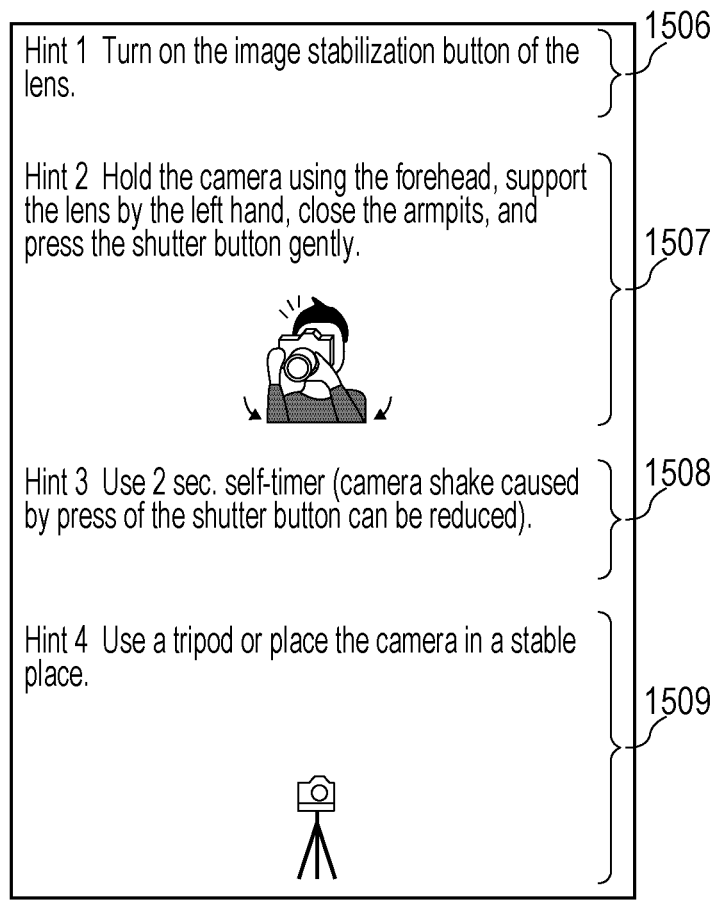

In step S708, the system control unit 50 displays a detailed hint. The detailed hint is displayed upon the hint guide item being selected, and indicates what to do regarding the instructions (guide) described in the hint guide item. If it is determined that the shutter speed is likely to cause blurring due to camera shake, that is, if the hint guide item 1505 is selected, hints 1506 to 1509 illustrated in FIG. 15E are partially displayed as a detailed hint on the display unit 28, as illustrated in FIG. 15D. Since the hints are partially displayed as illustrated in FIG. 15D, a desired part can be displayed by scrolling up or down the page. The hint guide items in the case of underexposure and overexposure, and detailed hints for each shooting mode and ISO speed are illustrated in FIG. 16. For example, if the hint guide item 1503 is displayed on the setting screen 901 illustrated in FIG. 15A, a detailed hint illustrated in FIG. 16 is displayed in a case where the shooting mode is the Tv mode, ISO 100 is set in ISO manual, and the shutter speed is not the highest. That is, a message "The subject is too bright and cannot be shot at proper exposure. Increase shutter speed (direction of "freeze") or decrease ISO speed (set smaller value)." is displayed. According to the table illustrated in FIG. 16, the detailed hint to be displayed varies in accordance with the shooting mode, the type of hint guide (overexposure or underexposure), and the setting of ISO speed.

In the exemplary embodiment described with reference to FIG. 7, the user can check a guide (warning) and detailed hints (measures) about a photometric value when using the simple UI. The user of the simple UI can recognize the target of warning and the measures to be taken. Furthermore, since the Tv icon and the Av icon are blinked as in the standard UI, a situation is unlikely to occur where the user who has shifted from the simple UI to the standard UI is unable to handle the standard UI.

According to the above-described exemplary embodiments, the display UI is switched between the simple UI and the standard UI, so that a beginner can easily know the setting item for which the setting is to be changed whereas a skilled user can quickly select a plurality of setting items, and thus the operability increases. Also, according to the above-described exemplary embodiments, the user can more easily obtain an image with a desired effect by using a method other than a method of changing a set value of a setting item. Furthermore, according to the above-described exemplary embodiments, the user operability in the case of setting a value of a setting item increases. Also, according to the above-described exemplary embodiments, a value to be used carefully among candidate values is less likely to be set without the intention of the user.

In the above-described exemplary embodiments, a description has been given of an example in which a value is set by moving a cursor on a bar. Alternatively, all candidate values may be displayed in a list view and a user may be allowed to select one of the values, without the bar being displayed. In this case, a line may be displayed between items or the colors of items may be changed to express the boundary between ranges of values. In the above-described exemplary embodiments, a description has been given of setting items about photo shooting, but the exemplary embodiments may be applied to image editing, text editing, or music editing. In the case of image editing, when color tone adjustment is selected, a matrix for determining colors (a board for setting a main setting item) and other setting items (color density, brightness, and so forth) are displayed in the form of items on a setting screen. When combining of images is selected, an image for deciding on a combining range (an image for setting a main value) and other setting items (correction by cutting, painting, and so forth) are displayed in the form of items on a setting screen. That is, a matrix or image related to a main setting item is displayed from the beginning before shift to a subscreen, so that the user can understand which is the main setting item and which is the item for which the setting is to be changed. In the case of the standard UI, a matrix or an image for deciding on a combining range is not displayed in the case of adjusting color tone or combining images, but an item representing a matrix or an item representing deciding on a combining range is displayed.

The above-described various control operations performed by the system control unit 50 may be performed by a single hardware unit, or the process may be shared by a plurality of hardware units so as to control the entire apparatus.

The exemplary embodiments of the present invention have been described. The present invention is not limited to the above-described specific embodiments, and various forms within the scope of the gist of the present invention are included in the present invention. The above-described exemplary embodiments are merely examples, and any selective exemplary embodiments may be appropriately combined.

In the above-described exemplary embodiments, the present invention is applied to the digital camera 100. However, the present invention is not limited thereto and is also applicable to the following apparatuses: a display control apparatus capable of switching a display UI of a setting screen for a plurality of setting items including a predetermined setting item; a display control apparatus capable of controlling display of a setting screen for a setting item in which a predetermined effect is given to a captured image in accordance with a set value; a display control apparatus capable of displaying a screen in which a setting item is settable on the basis of a designated position; and an electronic apparatus capable of setting a setting item in which a set value to be used carefully is included in candidate values.

That is, the present invention is applicable to a personal computer (PC), a mobile phone terminal, a portable image viewer, a digital photo frame, a music player, a game machine, an electronic book reader, a tablet PC, a smartphone, a projector, a home electric appliance including a display, and so forth.

Other Exemplary Embodiments

An exemplary embodiment of the present invention is also implemented by executing the following process, that is, a process in which software programs for implementing the functions of the above-described exemplary embodiments are supplied to a system or apparatus through a network or various types of recording media, and a computer (or CPU, MPU, or the like) of the system or apparatus reads and executes the program code. In this case, the programs and the recording medium storing the programs are included in the present invention.

According to the exemplary embodiments, the following configurations are disclosed.

1. A display control apparatus including:
   a switching unit configured to switch a display mode of a setting screen between a first display mode and a second display mode, the setting screen being arranged to display a plurality of setting items, including a predetermined setting item; and
   a control unit configured to:
   in the first display mode, display on the setting screen a first item which is related to the predetermined setting item and a plurality of items related to a plurality of setting items different from the predetermined setting item, and display a second item, on the setting screen in the case that the first item is selected, the second item representing candidate values which may be set as a value of the predetermined setting item, and
   in the second display mode, display on the setting screen a third item representing candidate values which may be set as a value of the predetermined setting item, and display a plurality of items related to the plurality of setting items.

2. The display control apparatus according to embodiment 1, wherein the number of setting items that are different from the predetermined setting item and are displayed on the setting screen is smaller in the second display mode than in the first display mode.

3. The display control apparatus according to embodiment 1 or 2, wherein the control unit performs control not to display the plurality of items related to the plurality of setting items when the second item is displayed, and performs control to display the plurality of items related to the plurality of setting items when the third item is displayed.

4. The display control apparatus according to any one of embodiments 1 to 3, wherein, if an operation of setting a value of the predetermined setting item is performed while the third item is displayed, the control unit performs control to display a guidance about the value that has been set, and if an operation of setting a value of the predetermined setting item is performed while the second item is displayed, the control unit performs control not to display the guidance.

5. The display control apparatus according to any one of embodiments 1 to 4, wherein each of the second item and the third item is a bar for setting a value of the predetermined setting item.

6. The display control apparatus according to any one of embodiments 1 to 5, wherein the control unit performs control to display an indicator indicating a set value on a bar representing candidate values of the predetermined setting item on the setting screen in the second display mode, and performs control to display a set value of the predetermined setting item in a form of a numeral and not to display the indicator on the setting screen in the first display mode before the second item is displayed.

7. The display control apparatus according to any one of embodiments 1 to 6, wherein the setting screen in the first display mode and the setting screen in the second display mode have different background colors.

8. The display control apparatus according to any one of embodiments 1 to 7, wherein, upon a first button being operated while a screen different from the setting screen is displayed, the control unit performs control to display the setting screen in the first display mode if the first display mode is set and display the setting screen in the second display mode if the second display mode is set.

9. The display control apparatus according to any one of embodiments 1 to 8, wherein the control unit performs control to display the first item and the third item such that the third item is larger in size than the first item.

10. The display control apparatus according to any one of embodiments 1 to 9, further including:
a selecting unit configured to select a shooting mode from among a plurality of shooting modes,
wherein the predetermined setting item varies according to a shooting mode selected by the selecting unit.

11. The display control apparatus according to embodiment 10, wherein the predetermined setting item is shutter speed if the shooting mode is a Tv mode.

12. The display control apparatus according to embodiment 10 or 11, wherein the predetermined setting item is aperture value if the shooting mode is an Av mode.

13. The display control apparatus according to any one of embodiments 1 to 12, wherein the third item is displayed together with an illustration and a character string that represent an effect of a set value and that are not displayed when the second item is displayed.

14. The display control apparatus according to any one of embodiments 1 to 13, wherein
in the setting screen in the first display mode, a range of some of candidate values that are settable for the predetermined setting item is displayed on a single screen, and
in the setting screen in the second display mode, a range of all candidate values that are settable for the predetermined setting item is displayed on a single screen.

15. The display control apparatus according to any one of embodiments 1 to 14, wherein
in the second display mode, the plurality of items related to the plurality of setting items are displayed together with character strings related to the plurality of setting items, and
in the first display mode, the plurality of items related to the plurality of setting items are not displayed together with sentences explaining the plurality of setting items.

16. A display control apparatus including:
a switching unit configured to switch a display mode of a setting screen for a plurality of setting items including a predetermined setting item between a first display mode and a second display mode; and
a control unit configured to perform control,
in the first display mode, to display a first item related to the predetermined setting item and a plurality of items related to a plurality of setting items different from the predetermined setting item on the setting screen, and to display a second item representing candidate values of the predetermined setting item on the setting screen upon the first item being selected, and
in the second display mode, to display a third item representing candidate values of the predetermined setting item and a plurality of items related to the plurality of setting items on the setting screen.

17. A display control apparatus including:
a selecting unit configured to select, as a value to be set for a predetermined setting item regarding shooting, a value on a predetermined screen from among a plurality of candidate values including a first value and a second value that makes a predetermined effect larger; and
a control unit configured to perform control to display, on a display unit, an indication for indicating a method for enhancing the predetermined effect by using a method different from setting of a value of the predetermined setting item, if a predetermined operation is performed in a state where the predetermined screen is displayed on the display unit, the predetermined operation being an operation of selecting a value from among the plurality of candidate values so that the predetermined effect increases.

18. The display control apparatus according to embodiment 17, wherein the control unit performs control not to display the indication on the display unit if an operation of selecting a value that makes the predetermined effect smaller is performed in a state where the predetermined screen is displayed on the display unit.

19. The display control apparatus according to embodiment 17 or 18, wherein the predetermined operation is an operation of selecting the second value.

20. The display control apparatus according to embodiment 17 or 18, wherein the predetermined operation is an operation of selecting, from among the plurality of candidate values, a value that makes the predetermined effect larger and that is larger or smaller than a currently selected value by a predetermined amount in a state where the predetermined screen is displayed on the display unit.

21. The display control apparatus according to any one of embodiments 17 to 20, further including:
a switching unit configured to switch a display mode of the predetermined screen between a first mode in which the predetermine screen is displayed in a first display format and a second mode in which the predetermined screen is displayed in a second display format,
wherein, in a state where the predetermined screen in the second mode is displayed on the display unit, the control unit performs control not to display the indication even if the predetermined operation is performed.

22. The display control apparatus according to embodiment 21, wherein the control unit performs control to display a guidance in accordance with a selected value in the first mode and not to display the guidance in the second mode.

23. The display control apparatus according to any one of embodiments 17 to 22, wherein
the indication is an item that does not include a sentence indicating the method, and
the control unit performs control to display the sentence upon the item being selected.

24. The display control apparatus according to any one of embodiments 17 to 22, wherein the indication is a sentence indicating the method.

25. The display control apparatus according to any one of embodiments 17 to 24, wherein the predetermined setting item is aperture value.

26. The display control apparatus according to embodiment 25, wherein the first value is a value of a minimum aperture among values for the aperture value, and the second value is a value of a maximum aperture among values for the aperture value.

27. The display control apparatus according to embodiment 25 or 26, further including:
an image capturing unit configured to capture an image in accordance with a set value of the predetermined setting item,
wherein the predetermined effect is a degree of blur of a background in the image captured by the image capturing unit.

28. The display control apparatus according to any one of embodiments 25 to 27, wherein the indication includes a guidance indicating zooming to a tele side.

29. The display control apparatus according to any one of embodiments 25 to 28, wherein the indication includes a guidance indicating decreasing of a distance between a subject and a digital camera.

30. The display control apparatus according to any one of embodiments 25 to 29, wherein the indication includes a guidance indicating increasing of a distance between a subject and a background.

31. The display control apparatus according to any one of embodiments 25 to 30, wherein the indication includes a guidance indicating that a degree of blur of a background is increased by using a lens with a smaller aperture value and a longer focal length.

32. The display control apparatus according to embodiment 28, further including:
a mounting unit on which a lens is mountable,
wherein the indication is displayed if a lens that is mounted is a zoom lens.

33. The display control apparatus according to any one of embodiments 17 to 32, wherein the second value is a smallest value that is settable as a value of the predetermined setting item.

34. The display control apparatus according to any one of embodiments 17 to 33, wherein an indication indicating that a value approximate to the second value makes the predetermined effect larger than a value approximate to the first value does is displayed on the predetermined screen.

35. The display control apparatus according to any one of embodiments 17 to 34, wherein a bar on which one of candidate values of the predetermined setting item is selectable is displayed on the predetermined screen.

36. A display control apparatus including:
a receiving unit configured to receive an operation of designating any one of positions on a display unit corresponding to a plurality of candidate values each being settable as a value of a predetermined setting item;
a selecting unit configured to select, upon receipt by the receiving unit of the operation of designating any one of the positions on the display unit corresponding to the plurality of candidate values, a value corresponding to the designated position from among the plurality of candidate values;
a control unit configured to, in a state where a first range and a second range are adjacent to each other, the first range corresponding to a first value group including a plurality of candidate values, the second range corresponding to a second value group including a plurality of candidate values, perform control to display a first guidance if any one of the candidate values included in the first value group is selected and to display a second guidance if any one of the candidate values included in the second value group is selected; and
a display control unit configured to perform control to display a mark representing a boundary between the first range and the second range on the display unit.

37. The display control apparatus according to embodiment 36, further including:
an image capturing unit,
wherein the image capturing unit captures an image in accordance with the value selected by the selecting unit.

38. The display control apparatus according to embodiment 36 or 37, wherein a region representing the first range and a region representing the second range are displayed in different formats on the display unit.

39. The display control apparatus according to any one of embodiments 36 to 38, wherein the first range and the second range are regions on a bar that is displayed on the display unit.

40. The display control apparatus according to embodiment 39, wherein the mark representing the boundary between the first range and the second range is a tick mark on the bar.

41. The display control apparatus according to any one of embodiments 36 to 40, wherein the display control unit performs control not to display information indicating a position corresponding to a candidate value that is not a candidate value at the boundary between the first range and the second range among the plurality of candidate values included in the first range.

42. The display control apparatus according to any one of embodiments 36 to 41, wherein
the predetermined setting item is a setting item regarding shooting, and
each of the first guidance and the second guidance is a guidance about shooting at a set value of the predetermined setting item.

43. The display control apparatus according to any one of embodiments 36 to 42, wherein the first guidance is a guidance indicating that a first effect is given to an image to be captured.

44. The display control apparatus according to any one of embodiments 36 to 43, wherein the display control unit performs control to display an item indicating that an effect given to an image to be captured is different between a case where a set value of the predetermined setting item is included in the first value group and a case where a set value of the predetermined setting item is included in the second value group.

45. The display control apparatus according to any one of embodiments 36 to 44, wherein the display control unit performs control to display a mark representing a boundary between a third range corresponding to a third value group and the second range.

46. The display control apparatus according to any one of embodiments 36 to 45, wherein the predetermined setting item is shutter speed or aperture value.

47. The display control apparatus according to any one of embodiments 36 to 46, wherein, if the predetermined setting item is shutter speed, the first guidance and the second guidance include any one of a guidance indicating that a set value enables shooting of a picture of a frozen motion, a guidance indicating that a set value is suitable for ordinary shooting, a guidance indicating that a set value produces an effect of panning, a guidance indicating that taking care is necessary to minimize camera shake when using a set value, a guidance indicating that a set value is suitable for shooting night scenes, a guidance indicating that a set value is suitable for expressing a blurred motion, and a guidance indicating that use of a tripod is recommended when using a set value.

48. The display control apparatus according to any one of embodiments 36 to 47, wherein, if the predetermined setting item is aperture value, the first guidance and the second guidance include any one of a guidance indicating that a set value enables shooting of a picture of a blurred background, a guidance indicating that a set value is suitable for ordinary shooting, a guidance indicating that a set value enables shooting of a picture of a sharp background, a guidance indicating that taking care is necessary to minimize camera shake when using a set value, and a guidance indicating that use of a tripod is recommended when using a set value.

49. The display control apparatus according to any one of embodiments 36 to 48, further including:
a switching unit configured to switch a display mode between a first display mode in which a guidance is displayed in accordance with a selected value and a second display mode in which the guidance is not displayed,
wherein the display control unit performs control not to display the mark representing the boundary between the first range and the second range when the display mode is the second display mode.

50. A display control apparatus including:
a receiving unit configured to receive an operation of designating any one of positions on a display unit corresponding to a plurality of candidate values each being settable as a value of exposure for shooting;
a selecting unit configured to select, upon receipt by the receiving unit of the operation of designating any one of the positions on the display unit corresponding to the plurality of candidate values, a value corresponding to the designated position from among the plurality of candidate values;
a shooting instructing unit configured to provide an instruction to perform shooting based on the value selected by the selecting unit;
a control unit configured to perform control to display a first guidance about exposure if a value in a first value range is selected and to display a second guidance about exposure if a value in a second value range is selected, the first value range and the second value range being related to exposure and adjacent to each other in the display unit; and
a display control unit configured to perform control to display, on the display unit, a mark representing a position of a value that is at a boundary between the first value range and the second value range.

51. An electronic apparatus including:
a receiving unit configured to receive an operation of designating any one of positions on a display unit corresponding to a plurality of candidate values of a predetermined setting item;
a selecting unit configured to select, upon receipt by the receiving unit of the operation of designating any one of the positions on the display unit corresponding to the plurality of candidate values, a value corresponding to the designated position from among the plurality of candidate values; and
a display control unit configured to perform control to display a predetermined warning on the display unit if an operation of designating a position corresponding to a first value group of the predetermined setting item is performed and not to display the predetermined warning on the display unit if an operation of designating a position corresponding to a second value group of the predetermined setting item is performed,
wherein an interval between positions on the display unit corresponding to individual values included in the first value group is smaller than an interval between positions on the display unit corresponding to individual values included in the second value group.

52. The electronic apparatus according to embodiment 51, wherein a direction in which positions corresponding to consecutive values included in the first value group are arranged is identical to a direction in which positions corresponding to consecutive values included in the second value group are arranged.

53. The electronic apparatus according to embodiment 51 or 52, wherein a first region representing a range of positions corresponding to the first value group and a second region representing a range of positions corresponding to the second value group are next to each other in the display unit.

54. The electronic apparatus according to embodiment 53, wherein a mark representing a boundary between the first region and the second region is displayed.

55. The electronic apparatus according to any one of embodiments 51 to 54, wherein the predetermined warning includes at least one of a warning that taking care is necessary to minimize camera shake and a warning that use of a tripod is recommended.

56. An electronic apparatus including:
a receiving unit configured to receive an operation of designating any one of positions on a display unit corresponding to a plurality of candidate values of a predetermined setting item;
a selecting unit configured to select, upon receipt by the receiving unit of the operation of designating any one of the positions on the display unit corresponding to the plurality of candidate values, a value corresponding to the designated position from among the plurality of candidate values; and
a display control unit configured to perform control to display a first region and a second region on the display unit such that the first region and the second region are distinguishable from each other, the first region being a range of positions corresponding to a first value group of the predetermined setting item, the second region being a range of positions corresponding to a second value group of the predetermined setting item,
wherein an interval between positions on the display unit corresponding to individual values included in the first value group is smaller than an interval between positions on the display unit corresponding to individual values included in the second value group.

57. The electronic apparatus according to embodiment 56, wherein the first region and the second region are represented by a bar, and the first region is displayed in a less eye-catching manner than the second region.

58. The electronic apparatus according to embodiment 56 or 57, wherein the first region is displayed in a form of a line that is lighter-colored or thinner than a line representing the second region, or the second region is displayed in a form of a solid line whereas the first region is displayed in a form of a dotted line.

59. An electronic apparatus including:
a receiving unit configured to receive an operation of designating any one of positions on a display unit corresponding to a plurality of candidate values of a predetermined setting item;

a selecting unit configured to select, upon receipt by the receiving unit of the operation of designating any one of the positions on the display unit corresponding to the plurality of candidate values, a value corresponding to the designated position from among the plurality of candidate values;

a switching unit configured to switch a display mode between a first display mode in which a guidance is displayed in accordance with a set value and a second display mode in which the guidance is not displayed; and a control unit configured to perform control so that, in the first display mode, an interval between positions on the display unit corresponding to individual values included in a first value group of the predetermined item is smaller than an interval between positions on the display unit corresponding to individual values included in a second value group of the predetermined item, whereas in the second display mode, the interval in the first value group is equal to the interval in the second value group.

60. The electronic apparatus according to embodiment 59, wherein, in the first display mode, displays representing positions corresponding to all values selectable by the selecting unit for the predetermined setting item are displayed on a single screen, and in the second display mode, displays representing positions corresponding to some of values selectable by the selecting unit are displayed on a single screen.

61. The electronic apparatus according to embodiment 56, wherein a predetermined warning is displayed on the display unit if an operation of designating a position corresponding to a candidate value in the first value group is performed, but the predetermined warning is not displayed on the display unit if an operation of designating a position corresponding to a candidate value in the second value group is performed.

62. The electronic apparatus according to any one of embodiments 51, 56, and 61, further including:

a switching unit configured to switch a display mode between a first display mode in which a guidance is displayed in accordance with a set value and a second display mode in which the guidance is not displayed; and a control unit configured to perform control so that, in the first display mode, an interval between positions on the display unit corresponding to individual values included in the first value group is smaller than an interval between positions on the display unit corresponding to individual values included in the second value group, whereas in the second display mode, the interval in the first value group is equal to the interval in the second value group.

63. The electronic apparatus according to any one of embodiments 51 to 62, wherein the predetermined setting item is shutter speed or aperture value.

64. The electronic apparatus according to any one of embodiments 51 to 63, wherein the plurality of candidate values of the predetermined setting item are set in one step increments.

65. The electronic apparatus according to any one of embodiments 51 to 64, wherein the range corresponding to the position of the second value group is between the range corresponding to the position of the first value group and a range corresponding to a position of a third value group in the display unit, and an interval between positions on the display unit corresponding to individual values included in the third value group is smaller than an interval between positions on the display unit corresponding to individual values included in the second value group.

66. The electronic apparatus according to embodiment 65, wherein the third value group is settable only when the electronic apparatus is connected to a specific external apparatus.

67. The electronic apparatus according to any one of embodiments 51 to 66, wherein candidate values included in the second value group are values recommended for a beginner, whereas candidate values included in the first value group are values not recommended for the beginner.

68. The electronic apparatus according to any one of embodiments 51 to 67, wherein, in the display unit, the range corresponding to the position of the first value group is smaller than the range corresponding to the position of the second value group.

69. The electronic apparatus according to any one of embodiments 51 to 68, further including:

a touch detecting unit configured to receive a touch operation performed on any one of positions on the display unit corresponding to a plurality of candidate values of the predetermined setting item, wherein the selecting unit selects a value corresponding to a position touched on the display unit in the touch operation.

According to an exemplary embodiment of the present invention, both a beginner and a user who is skilled in handling the apparatus are able to perform a setting operation for a setting item with enhanced operability. In other words, the present invention assists a user in operating the apparatus by providing technical information to enable the user to properly operate the system. Prompts enable a user, skilled or otherwise, to interact with the apparatus in a continued or guided way for enabling its proper functioning.

According to an exemplary embodiment of the present invention, an image with an effect desired by a user can be more easily obtained by using a method other than changing of a set value of a setting item.

According to an exemplary embodiment of the present invention, user operability in the case of setting a value of a setting item can be increased.

According to an exemplary embodiment of the present invention, a value to be used carefully among candidate values is less likely to be set without the intention of a user.

Embodiment(s) or other aspects of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, firmware, hardware, other component, or the like (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-254220, No. 2016-254221, No. 2016-254222, and No. 2016-254223 filed Dec. 27, 2016, which are hereby incorporated by reference herein in their entirety.

What is claimed is:

1. A display control apparatus comprising:
at least one memory and at least one processor which function as:
a switching unit configured to switch a display mode of a setting screen between a first display mode and a second display mode, the setting screen being arranged to display a plurality of setting items, including a predetermined setting item; and
a control unit configured to:
in the first display mode, display on the setting screen a first item which is related to the predetermined setting item and a plurality of items related to a plurality of setting items different from the predetermined setting item, and not display candidate values of the predetermined setting item, and
in the second display mode, display on the setting screen candidate values of the predetermined setting item together with a plurality of items related to the plurality of setting items,
wherein, on the setting screen in the first display mode, a setting item is selectable from the first item and the plurality of items, and a sub screen of the setting screen displaying candidates of setting values of the selected item is displayed in response to selection of the setting item,
in a case that the first item is selected, display the candidate values which may be set as a value of the predetermined setting item,
a value is to be selectable from candidate values of the predetermined setting item in a sub screen of the first item,
wherein, in the second display mode, a setting item is selectable from the plurality of items on the setting screen and a value is selectable from the candidate values of the predetermined setting item on the setting screen, and
on the setting screen, in response to item selection of the plurality of items, a sub screen of the setting screen displaying candidates of setting values of the selected item is displayed, and a value is to be selectable from candidate values of the selected item in the sub screen.

2. The display control apparatus according to claim 1, wherein the number of setting items that are different from the predetermined setting item and are displayed on the setting screen is smaller in the second display mode than in the first display mode.

3. The display control apparatus according to claim 1, wherein the control unit performs control not to display the plurality of items related to the plurality of setting items when a second item is displayed, and performs control to display the plurality of items related to the plurality of setting items when a third item is displayed.

4. The display control apparatus according to claim 1, wherein, if an operation of setting a value of the predetermined setting item is performed while a third item is displayed, the control unit performs control to display a guidance about the value that has been set, and if an operation of setting a value of the predetermined setting item is performed while a second item is displayed, the control unit performs control not to display the guidance.

5. The display control apparatus according to claim 1, wherein each of a second item and a third item is a bar for setting a value of the predetermined setting item.

6. The display control apparatus according to claim 1, wherein the control unit performs control to display an indicator indicating a set value on a bar representing candidate values of the predetermined setting item on the setting screen in the second display mode, and performs control to display a set value of the predetermined setting item in a form of a numeral and not to display the indicator on the setting screen in the first display mode before a second item is displayed.

7. The display control apparatus according to claim 1, wherein the setting screen in the first display mode and the setting screen in the second display mode have different background colors.

8. The display control apparatus according to claim 1, wherein, upon a first button being operated while a screen different from the setting screen is displayed, the control unit performs control to display the setting screen in the first display mode if the first display mode is set and display the setting screen in the second display mode if the second display mode is set.

9. The display control apparatus according to claim 1, wherein the control unit performs control to display the first item and a third item such that the third item is larger in size than the first item.

10. The display control apparatus according to claim 1, wherein the at least one memory and the at least one processor further function as:
a selecting unit configured to select a shooting mode from among a plurality of shooting modes,
wherein the predetermined setting item varies according to a shooting mode selected by the selecting unit.

11. The display control apparatus according to claim 10, wherein the predetermined setting item is shutter speed if the shooting mode is a Tv mode.

12. The display control apparatus according to claim 10, wherein the predetermined setting item is aperture value if the shooting mode is an Av mode.

13. A control method for a display control apparatus, comprising:
switching a display mode of a setting screen between a first display mode and a second display mode, the setting screen being arranged to display a plurality of setting items, including a predetermined setting item; and performing control,
- in the first display mode, to display on the setting screen a first item which is related to the predetermined setting item and a plurality of items related to a plurality of setting items different from the predetermined setting item, and not to display candidate values of the predetermined setting item, and
- in the second display mode, to display on the setting screen candidate values of the predetermined setting item together with a plurality of items related to the plurality of setting items, wherein, on the setting screen in the first display mode, a setting item is selectable from the first item and the plurality of items, and a sub screen of the setting screen displaying candidates of setting values of the selected item is displayed in response to selection of the setting item, in a case that the first item is selected, display the candidate values which may be set as a value of the predetermined setting item, a value is to be selectable from candidate values of the predetermined setting item in a sub screen of the first item, and wherein, in the second display mode, a setting item is selectable from the plurality of items on the setting screen and a value is selectable from the candidate values of the predetermined setting item on the setting screen, and on the setting screen, in response to item selection of the plurality of items, a sub screen of the setting screen displaying candidates of setting values of the selected item is displayed, and a value is to be selectable from candidate values of the selected item in the sub screen.

14. A non-transitory computer-readable storage medium storing a program that causes a computer to implement a method for a control apparatus, the method comprising:

switching a display mode of a setting screen between a first display mode and a second display mode, the setting screen being arranged to display a plurality of setting items, including a predetermined setting item; and performing control,
- in the first display mode, to display on the setting screen a first item which is related to the predetermined setting item and a plurality of items related to a plurality of setting items different from the predetermined setting item, and not to display candidate values of the predetermined setting item, and
- in the second display mode, to display on the setting screen candidate values the predetermined setting item together with a plurality of items related to the plurality of setting items, wherein, on the setting screen in the first display mode, a setting item is selectable from the first item and the plurality of items level, and a sub screen of the setting screen displaying candidates of setting values of the selected item is displayed in response to selection of the setting item, in a case that the first item is selected, display the candidate values which may be set as a value of the predetermined setting item, a value is to be selectable from candidate values of the predetermined setting item in a sub screen of the first item, and wherein, in the second display mode, a setting item is selectable from the plurality of items on the setting screen and a value is selectable from the candidate values of the predetermined setting item on the setting screen, and on the setting screen, in response to item selection of the plurality of items, a sub screen of the setting screen displaying candidates of setting values of the selected item is displayed, and a value is to be selectable from candidate values of the selected item in the sub screen.

* * * * *